(12) United States Patent
Kawamura

(10) Patent No.: US 8,805,272 B2
(45) Date of Patent: *Aug. 12, 2014

(54) RADIO TRANSMISSION SYSTEM AND ELECTRONIC DEVICE

(75) Inventor: Hirofumi Kawamura, Chiba (JP)

(73) Assignee: Sony Corporation, Tokyo (JP)

( * ) Notice: Subject to any disclaimer, the term of this patent is extended or adjusted under 35 U.S.C. 154(b) by 325 days.

This patent is subject to a terminal disclaimer.

(21) Appl. No.: 12/830,696

(22) Filed: Jul. 6, 2010

(65) Prior Publication Data

US 2011/0009078 A1    Jan. 13, 2011

(30) Foreign Application Priority Data

Jul. 13, 2009  (JP) ................................. 2009-164507

(51) Int. Cl.
*H04B 7/15* (2006.01)
*H04B 7/26* (2006.01)

(52) U.S. Cl.
CPC .................................. *H04B 7/2606* (2013.01)
USPC ........................................ 455/11.1; 455/131

(58) Field of Classification Search
CPC .......... H04B 7/26; H04B 7/0828; H04B 7/04; H04B 7/185; H04B 7/18504; H04B 1/30; H04B 7/2606; H04B 7/155; H01Q 9/42; H01Q 1/243; H01Q 11/10; H01Q 13/10; H01Q 21/30; H01Q 21/28; H01Q 7/00; H01Q 13/06; H01Q 1/282; H01Q 1/38; H01Q 1/521; H01Q 21/08; H01Q 25/02; H01Q 3/26; H01Q 3/32; H03D 7/125; H03J 9/002; G07C 9/00182; G07C 2009/00793; H04W 8/04; H04W 16/26; H04W 88/02
USPC .......... 455/11.1, 131, 103, 118, 108; 710/105
See application file for complete search history.

(56) References Cited

U.S. PATENT DOCUMENTS

| | | | | |
|---|---|---|---|---|
| 2,548,457 A * | 4/1951 | Wilson | ........................... | 439/583 |
| 5,739,794 A * | 4/1998 | Nagy et al. | ..................... | 343/713 |
| 6,065,425 A * | 5/2000 | Takaki et al. | .............. | 118/723 E |
| 6,553,239 B1 * | 4/2003 | Langston | ....................... | 455/103 |
| 2007/0037516 A1 | 2/2007 | Sawai et al. | | |

(Continued)

FOREIGN PATENT DOCUMENTS

JP   9-83538 A    3/1997
JP   10-154211 A   6/1998

(Continued)

OTHER PUBLICATIONS

Official Action issued on Feb. 5, 2013, in corresponding Japanese Patent Application No. 2009-164507.

(Continued)

*Primary Examiner* — Lana N Le
(74) *Attorney, Agent, or Firm* — Dentons US LLP

(57) ABSTRACT

A radio transmission system includes: a first electronic device; and a second electronic device having a mounting structure mounted with the first electronic device, wherein a millimeter wave signal transmission line capable of transmitting information in a millimeter wave band is formed between the first electronic device and the second electronic device when the first electronic device is mounted in the mounting structure of the second electronic device, and between the first electronic device and the second electronic device, a transmission object signal is converted into a millimeter wave signal and then the millimeter wave signal is transmitted via the millimeter wave signal transmission line.

15 Claims, 20 Drawing Sheets

(56) References Cited

U.S. PATENT DOCUMENTS

2007/0239929 A1   10/2007  Chen et al.
2009/0037627 A1*  2/2009  Rofougaran ................. 710/105
2011/0038282 A1*  2/2011  Mihota et al. ................ 455/500
2011/0066774 A1*  3/2011  Rofougaran ................ 455/11.1

FOREIGN PATENT DOCUMENTS

| | | |
|---|---|---|
| JP | 2001-195553 | 7/2001 |
| JP | 2003-242449 A | 8/2003 |
| JP | 2007-251570 A | 9/2007 |
| JP | 2007-299338 | 11/2007 |
| JP | 2008-102677 A | 5/2008 |

OTHER PUBLICATIONS

Extended European Search Report issued in connection with related EP application No. EP 10006830 dated May 14, 2014.

* cited by examiner

F I G . 5
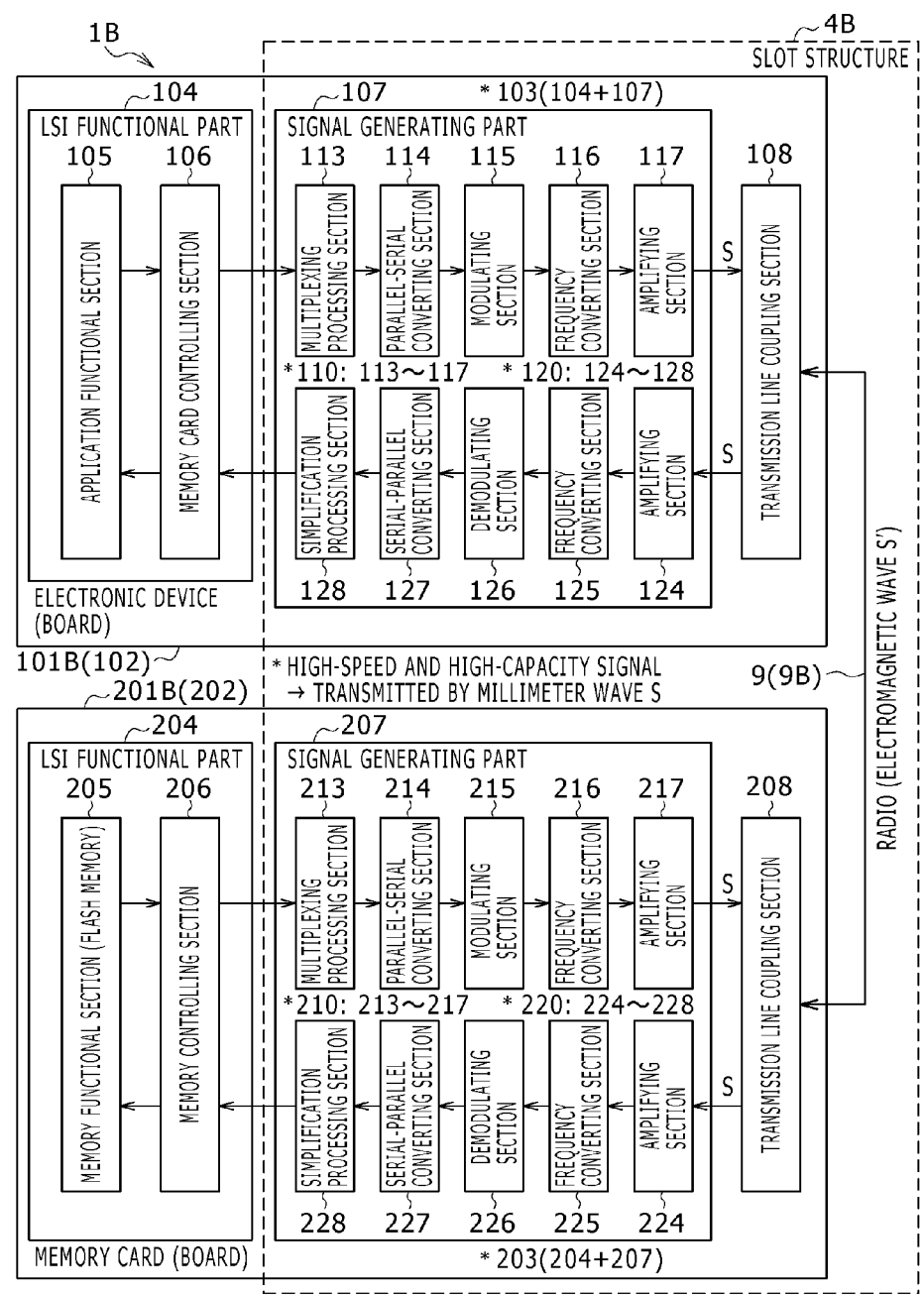

FIG. 9A
$$L \text{ [dB]} = 10 \log_{10}((4\pi d/\lambda)^2) \quad \cdots \text{(A)}$$
$$d_2/d_1 = 10^{(DU/20)} \quad \cdots \text{(B)}$$
FIG. 9B
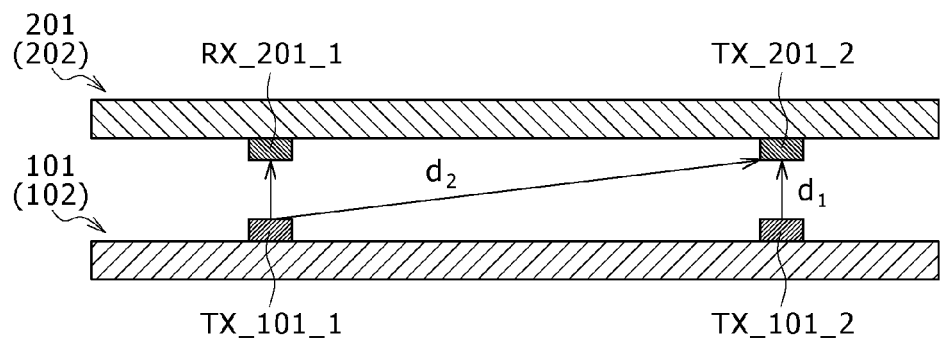
FIG. 9C
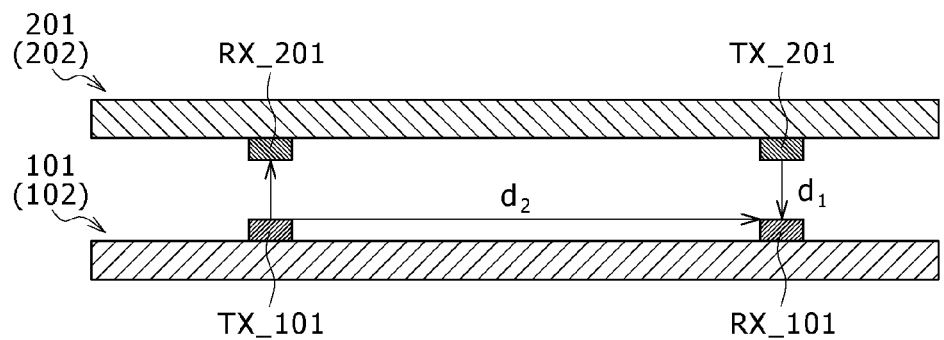

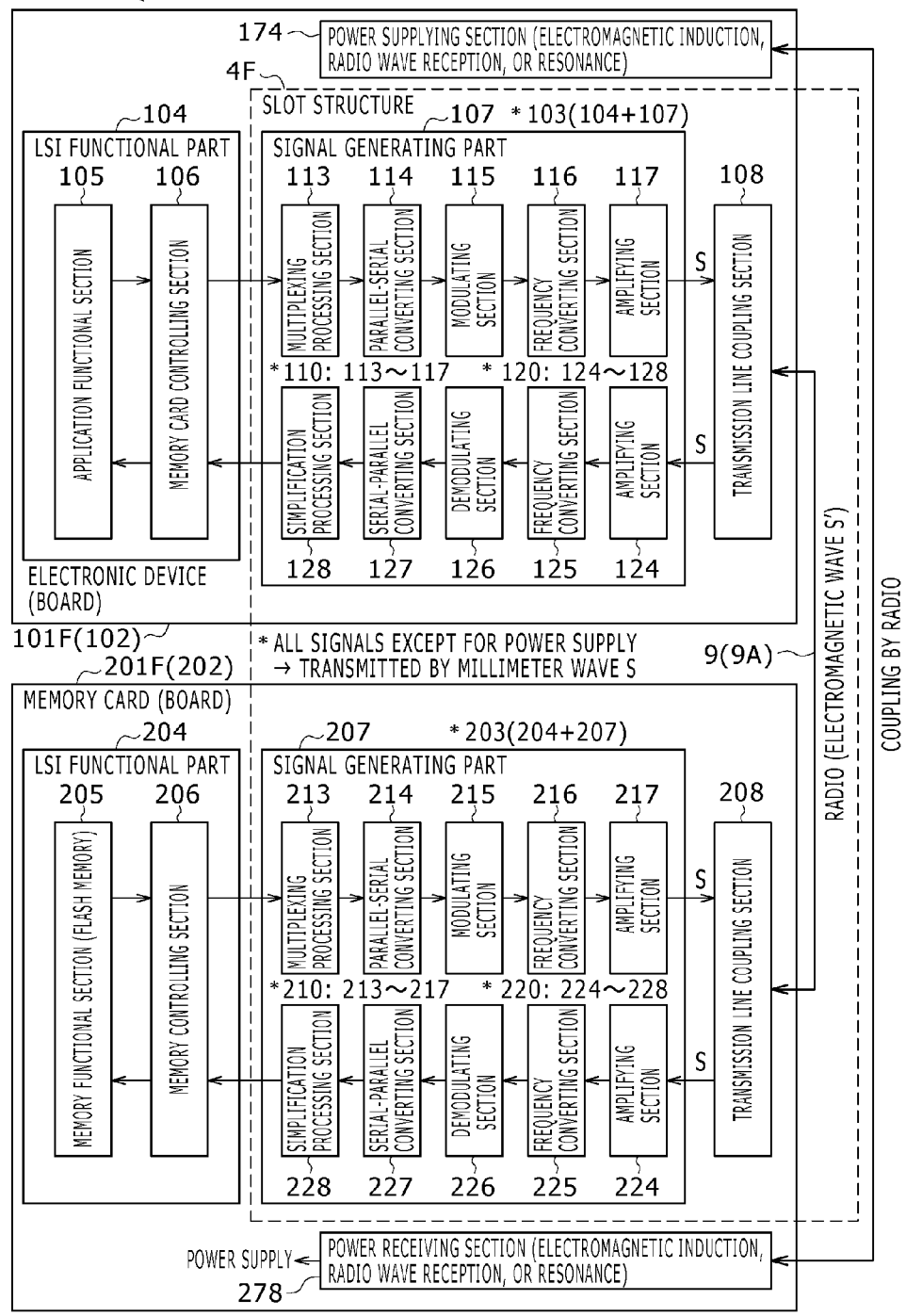

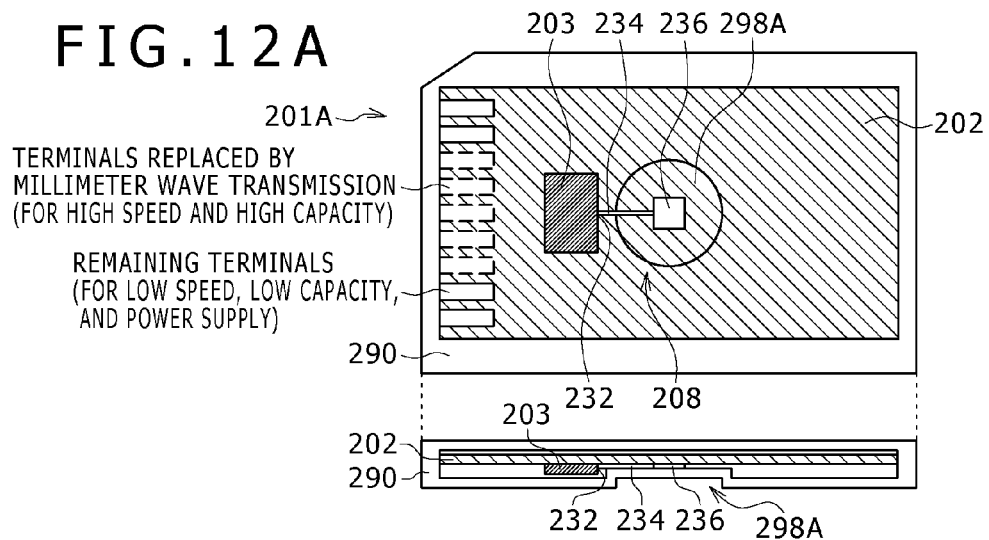
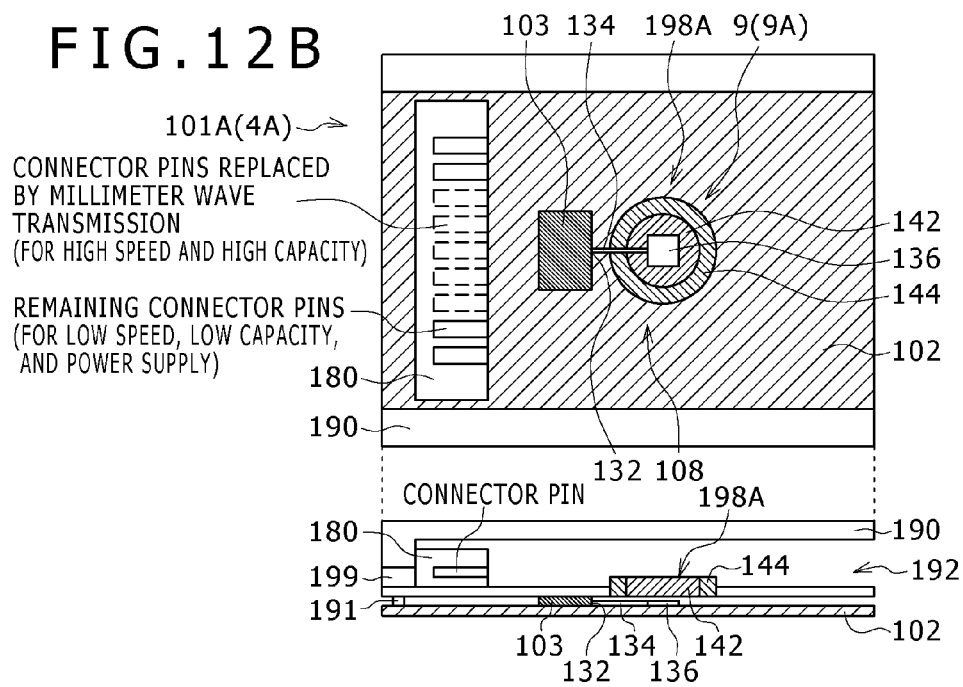
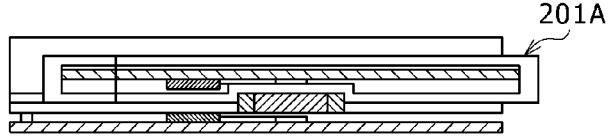

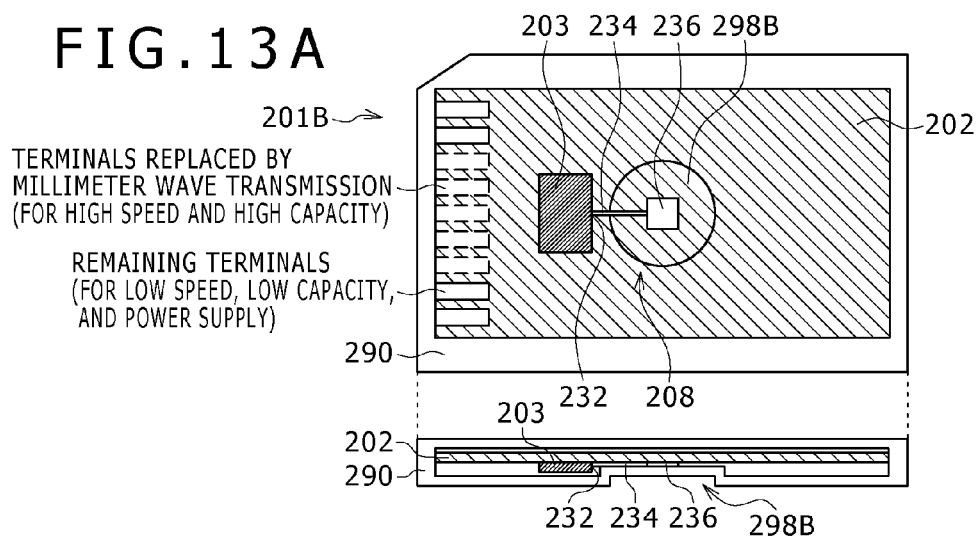
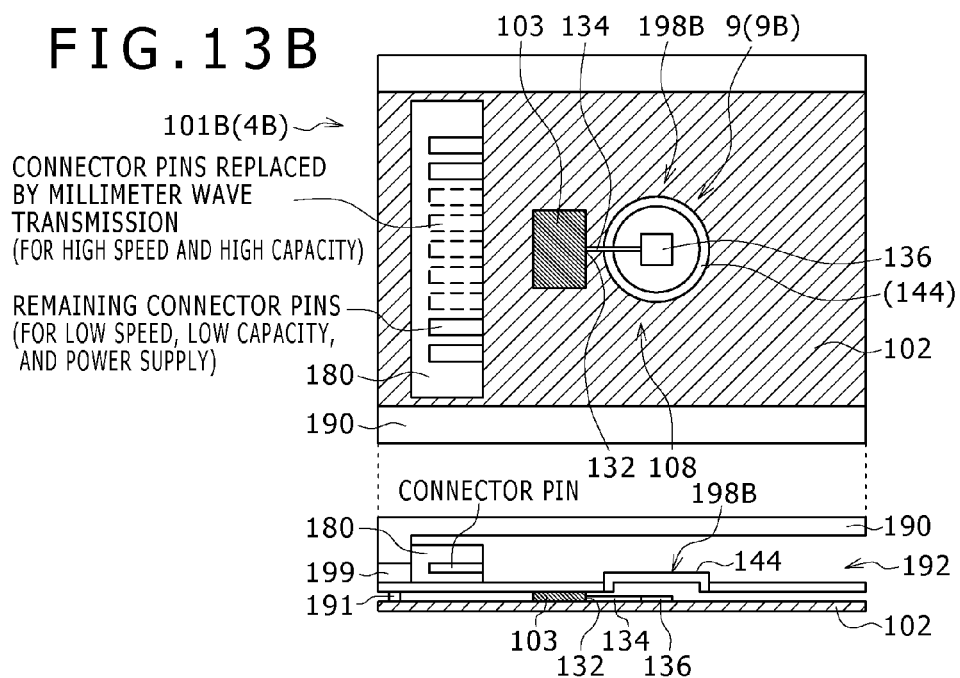
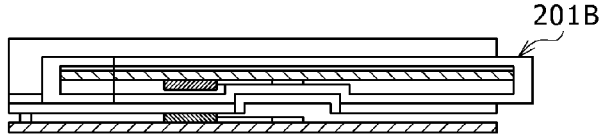

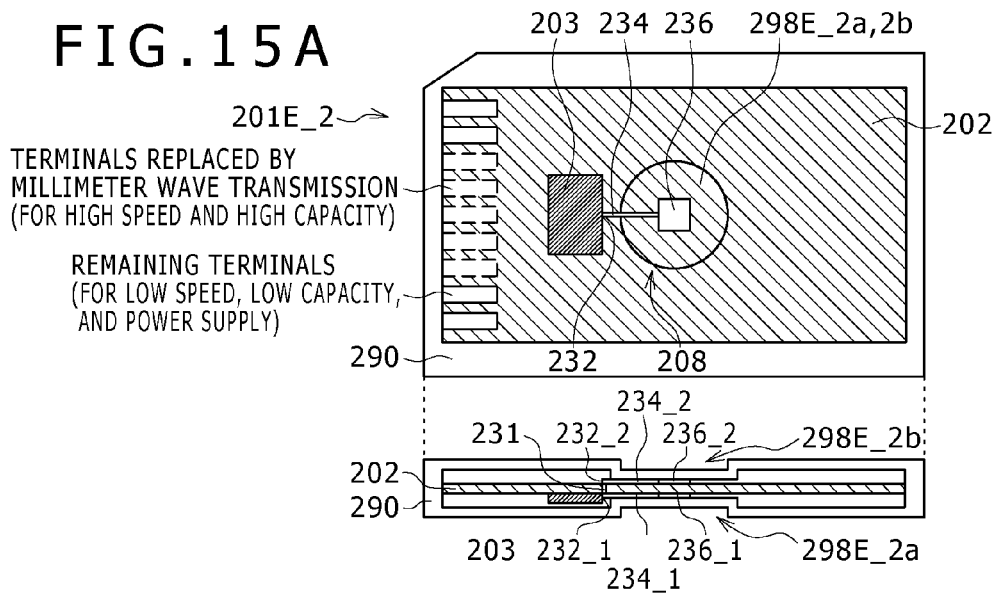
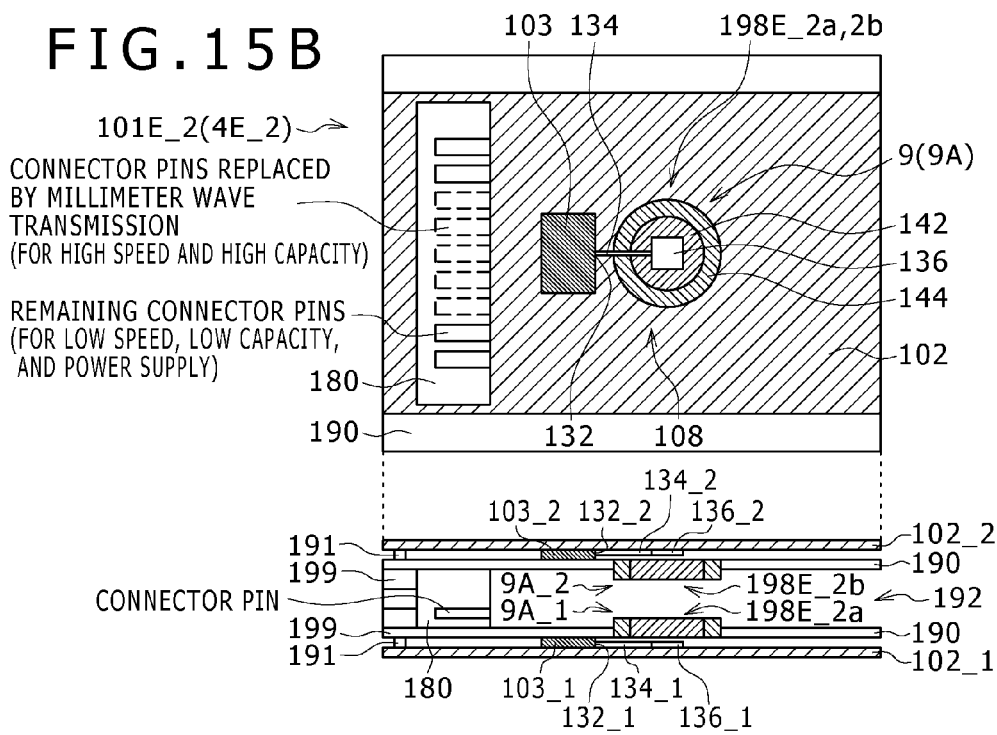
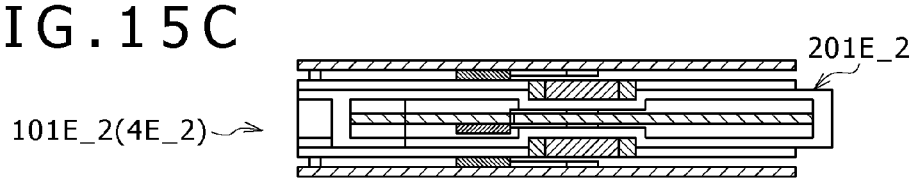

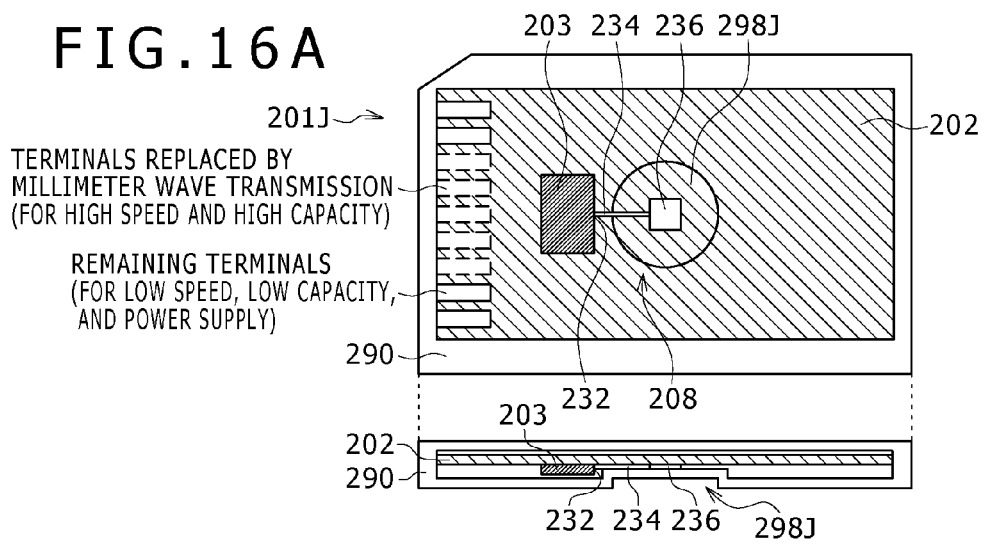
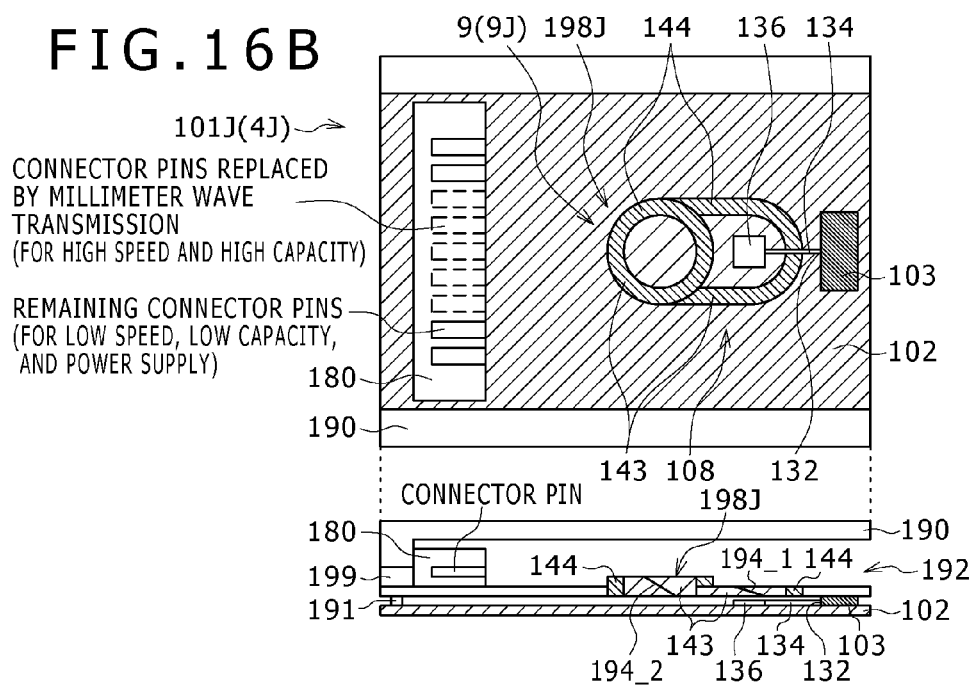
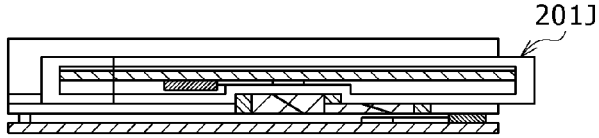

RADIO TRANSMISSION SYSTEM AND ELECTRONIC DEVICE

BACKGROUND OF THE INVENTION

1. Field of the Invention

The present invention relates to a radio transmission system and an electronic device, and particularly to a mechanism of signal transmission between electronic devices when one electronic device is mounted in the other electronic device (on a main unit side, for example).

2. Description of the Related Art

For example, signal transmission may be made in a state of one electronic device being mounted in another electronic device. For example, a card type information processing device typified by a so-called IC card or memory card including a central processing unit (CPU), a nonvolatile storage device (for example a flash memory) and the like can be mounted (detachable) in an electronic device on a main unit side (see Japanese Patent Laid-Open Nos. 2001-195553 and 2007-299338 (hereinafter referred to as Patent Documents 1 and 2)). The card type information processing device as an example of one (first) electronic device will hereinafter be referred to also as a "card type device." The other (second) electronic device on the main unit side will hereinafter be also referred to simply as an electronic device.

Mounting the card type device in the electronic device on the main unit side provides advantages of taking out data, increasing storage capacitance, and adding additional functions, for example.

In this case, when an electric connection is established between the electronic device and the card type device, the electric connection is achieved by mounting the card type device in the electronic device via a connector (electric connecting means) in a related-art mechanism. For example, in order to establish an electric interface connection to a memory card, a terminal part is provided to the memory card, and the electronic device is provided with a slot structure (an example of a fitting structure). The memory card is inserted into the slot structure of the electronic device to bring the terminal parts into contact with each other. This is an idea of providing a signal interface by electric wiring. Incidentally, the slot structure also has a function of means for fixing the memory card.

There are generally standards for casing shapes and the signal interface including the terminal part and the slot structure, and an electrical and mechanical interface between the terminal part and the slot structure is defined according to the standards.

For example, Patent Document 1 (paragraph 19, FIG. 2 to 5) shows that a card interface $21f$ is provided inside a controller LSI 21, and that the card interface $21f$ is connected to an electronic device via a plurality of signal pins (corresponding to the terminal part).

In addition, Patent Document 2 (paragraph 42, FIG. 1, 3, 5 and the like) shows that an external connecting terminal 24 (corresponding to the terminal part) connected via a conductive via to a wiring pattern for connection to an external device (corresponding to the electronic device) at a determined position of a standardized casing 19 is provided.

SUMMARY OF THE INVENTION

However, signal transmission between the electronic device and the card type device by electric contact (that is, electric wiring) via the terminal part of the slot structure has the following problems.

1) The transmission speed and transmission capacity of signal transmission by electric wiring are limited. For example, LVDS (Low Voltage Differential Signaling) is known as a method for achieving high-speed signal transmission by electric wiring, and applying the mechanism of LVDS is considered. However, recent further increases in capacity and speed of transmission data involve problems such as an increase in power consumption, an increase in effect of signal distortion due to reflection and the like, and an increase in spurious radiation. For example, LVDS is reaching a limit in a case of high-speed (real-time) transmission of video signals (including image pickup signals) and signals of computer images and the like within a device.

2) In order to deal with the problem of increasing the speed of transmission data, transmission speed per signal line may be decreased by increasing the number of pieces of wiring and thus achieving signal parallelization. However, this measure leads to an increase of input and output terminals, which results in drawbacks such as complication of a printed board and cable wiring, and an increase in semiconductor chip size.

3) When electric wiring is used, the wiring becomes an antenna, and causes a problem of electromagnetic field interference. In order to take measures against the problem, the configuration of the electronic device and the card type device is complicated. When wiring is routed for high-speed and high-capacity data, electromagnetic field interference becomes a noticeable problem. In addition, when terminals are made bare in the card type device, there is a problem of electrostatic breakdown.

Thus, the transmission of signals of the electronic device and the card type device by electric wiring has difficulties yet to be solved.

While problems in signal transmission using electric wiring between the card type device and the electronic device on the main unit side have been described above, these problems are not limited to relation to the card type device. The same is true for cases where signal transmission is made using electric wiring between two electronic devices when one electronic device is mounted in the other electronic device.

The present invention has been made in view of the above situations. It is desirable to provide a novel mechanism that enables transmission of signals desired to have a high-speed characteristic and a high-capacity characteristic such as video signals, and signals of computer images without using electric wiring while solving at least one of the above-described problems of 1) to 3) in a case where signal transmission is made in a state of one electronic device being mounted in another electronic device.

In one mode of the present invention, a radio transmission system is formed by a first electronic device and a second electronic device. Between the two electronic devices in a state of the first electronic device being mounted in a mounting structure of the second electronic device (or in a state of the two electronic devices being disposed at a relatively short distance from each other), a signal as an object for transmission is converted into a millimeter wave signal, and then the millimeter wave signal is transmitted via a millimeter wave signal transmission line. "Radio transmission" in the present invention means transmission of a signal as an object for transmission by a millimeter wave rather than electric wiring.

In each of the first electronic device and the second electronic device, a transmitting section and a receiving section are disposed so as to be combined in a pair with the millimeter wave signal transmission line interposed between the transmitting section and the receiving section. Signal transmission between the two electronic devices may be unidirectional (one direction) signal transmission or bidirectional signal transmission.

For example, when the first electronic device is a transmitting side and the second electronic device is a receiving side, a transmitting section is disposed in the first electronic device, and a receiving section is disposed in the second electronic device. When the second electronic device is a transmitting side and the first electronic device is a receiving side, a transmitting section is disposed in the second electronic device, and a receiving section is disposed in the first electronic device.

Suppose that the transmitting section for example includes a signal generating section (signal converting section for converting an electric signal as an object for transmission into a millimeter wave signal) on the transmitting side for subjecting the signal as object for transmission to signal processing and generating the millimeter wave signal and a signal coupling section on the transmitting side for coupling the millimeter wave signal generated by the signal generating section on the transmitting side to a transmission line (millimeter wave signal transmission line) for transmitting the millimeter wave signal. The signal generating section on the transmitting side is preferably integral with a functional part for generating the transmission object signal.

For example, the signal generating section on the transmitting side has a modulating circuit. The modulating circuit modulates the transmission object signal. The signal generating section on the transmitting side generates the millimeter wave signal by frequency-converting the signal after being modulated by the modulating circuit. In principle, the transmission object signal may be directly converted into the millimeter wave signal. The signal coupling section on the transmitting side supplies the millimeter wave signal generated by the signal generating section on the transmitting side to the millimeter wave signal transmission line.

On the other hand, suppose that the receiving section includes for example a signal coupling section on the receiving side for receiving the millimeter wave signal transmitted via the millimeter wave signal transmission line and a signal generating section on the receiving side for subjecting the millimeter wave signal (input signal) received by the signal coupling section on the receiving side to signal processing and generating an ordinary electric signal (transmission object signal) (signal converting section for converting the millimeter wave signal into the electric signal as object for transmission). The signal generating section on the receiving side is preferably integral with a functional part for receiving the transmission object signal. For example, the signal generating section on the receiving side has a demodulating circuit. An output signal is generated by frequency-converting the millimeter wave signal. The demodulating circuit thereafter demodulates the output signal, whereby the transmission object signal is generated. In principle, direct conversion from the millimeter wave signal to the transmission object signal may be performed.

That is, in providing a signal interface between the first electronic device and the second electronic device, the transmission object signal is transmitted in a contactless manner by the millimeter wave signal (not transmitted by electric wiring). Preferably, at least signal transmission (signal transmission required to be performed at high speed in particular) is performed in a contactless manner by a communication interface using the millimeter wave signal. In short, signal transmission performed by electric contact (electric wiring) via a mounting structure between the first electronic device and the second electronic device is performed by the millimeter wave signal. By performing signal transmission in the millimeter wave band, it is possible to achieve high-speed signal transmission on the order of Gbps, limit a range covered by the millimeter wave signal (reasons for this will be described in embodiments), and obtain effects due to this nature.

Objects not required to be transmitted at high speed may also be transmitted in a noncontact (contactless) manner by a communication interface using the millimeter wave signal. Preferably, power to be used on the side of the first electronic device is transmitted by radio. An electromagnetic induction system, a radio wave reception system, and a resonance system, for example, can be adopted for power transmission by radio. However, when positional displacement, interference with existing circuits, efficiency and the like are considered, the resonance system (especially a system using a magnetic field resonance phenomenon) is preferably adopted.

In this case, it suffices for each signal coupling section to allow the first electronic device and the second electronic device to transmit millimeter wave signals via the millimeter wave signal transmission line. For example, each signal coupling section may have an antenna structure (antenna coupling section), or may achieve coupling without having an antenna structure.

The "millimeter wave signal transmission line for transmitting the millimeter wave signal" may be an air (so-called free space), but preferably has a structure that transmits the millimeter wave signal while confining the millimeter wave signal in the transmission line. By actively utilizing the nature, the routing of the millimeter wave signal transmission line can be determined arbitrarily as by electric wiring. The millimeter wave signal transmission line is preferably for example a millimeter wave signal transmission line formed by a dielectric material capable of millimeter wave signal transmission (which transmission line will be referred to as a dielectric transmission line or a millimeter wave intra-dielectric transmission line) or a hollow waveguide forming a transmission line and provided with a shielding material for suppressing external radiation of the millimeter wave signal, the inside of the shielding material being hollow.

Incidentally, in the case of an air (so-called free space), each signal coupling section employs an antenna structure, and performs signal transmission in a space for a short distance by the antenna structure. On the other hand, when the millimeter wave signal transmission line is formed by a dielectric material, each signal coupling section can employ an antenna structure, but this is not essential.

The constitution of each signal coupling section and the millimeter wave signal transmission line is preferably applied to the mounting structure provided to the second electronic device to be mounted with the first electronic device. For example, depending on some standards, the shape, position and the like of the mounting structure are standardized. In this case, the constitution of each signal coupling section and the millimeter wave signal transmission line is applied to the part of the mounting structure, whereby compatibility with an existing first electronic device (for example a card type device) is secured (ensured).

According to one mode of the present invention, when signal transmission is made in a state of a first electronic device being mounted in a second electronic device, a signal interface with a transmission speed and a transmission capacity that are difficult to achieve by electric wiring can be realized. In that case, casing shape and structure are not complicated because many pieces of wiring as in a case of establishing connection by electric wiring are not required. In addition, because the millimeter wave band is used, signal transmission can be made without using electric wiring, and no disturbance is caused to other electric wiring within the devices.

A signal interface between the first electronic device and the second electronic device can be constructed by the millimeter wave signal unidirectionally or bidirectionally with a simple and inexpensive constitution without depending on a connector having a large number of terminals or signal wiring.

BRIEF DESCRIPTION OF THE DRAWINGS

FIG. 5 is a diagram of assistance in explaining a signal interface in a radio transmission system according to a second embodiment from an aspect of functional configuration;

FIGS. 9A to 9C are diagrams of assistance in explaining adequate conditions for space division multiplexing;

FIG. 10 is a diagram of assistance in explaining a signal interface in a radio transmission system according to a sixth embodiment from an aspect of functional configuration;

FIGS. 12A to 12C are diagrams of assistance in explaining a first example of a millimeter wave transmission structure according to a present embodiment;

FIGS. 13A to 13C are diagrams of assistance in explaining a second example of the millimeter wave transmission structure according to the present embodiment;

FIGS. 15A to 15C are diagrams of assistance in explaining a fourth example of the millimeter wave transmission structure according to the present embodiment;

FIGS. 16A to 16C are diagrams of assistance in explaining a fifth example of the millimeter wave transmission structure according to the present embodiment;

DETAILED DESCRIPTION OF THE PREFERRED EMBODIMENTS

Preferred embodiments of the present invention will hereinafter be described in detail with reference to the drawings. When each functional element is distinguished by embodiment, each functional element will be identified by a capital English reference such as A, B, C, . . . . In addition, each functional element may be identified by a reference "_@" to be distinguished in a subdivided manner as appropriate. These references will be omitted when description is made without making any particular distinction. The same is true for the drawings.

Description will be made in the following order.
1. Radio Transmission System: First Embodiment (Dielectric Transmission Line)
2. Radio Transmission System: Second Embodiment (Free Space Transmission Line)
3. Radio Transmission System: Third Embodiment (Dielectric Transmission Line+Free Space Transmission Line)
4. Radio Transmission System: Fourth Embodiment (Millimeter Wave Transmission of Low-Speed Signal As Well)
5. Radio Transmission System: Fifth Embodiment (Space Division Multiplexing)
6. Radio Transmission System: Sixth Embodiment (Fourth Embodiment+Radio Transmission of Power As Well)
7. Radio Transmission System: Seventh Embodiment (Fifth Embodiment+Radio Transmission of Power As Well)
8. Millimeter Wave Transmission Structure: First Example (Dielectric Transmission Line)
9. Millimeter Wave Transmission Structure: Second Example (Free Space Transmission Line)
10. Millimeter Wave Transmission Structure: Third Example (Millimeter Wave Signal Transmission Lines of Plurality of Systems are Disposed on Same Board Surface)
11. Millimeter Wave Transmission Structure: Fourth Example (Millimeter Wave Signal Transmission Lines of Plurality of Systems are Disposed on Different Board Surfaces)
12. Millimeter Wave Transmission Structure: Fifth Example (Antennas are Arranged in Displaced Manner)
13. Millimeter Wave Transmission Structure: Sixth Example (Shape Compatibility with Existing Card)
14. Millimeter Wave Transmission Structure: Seventh Example (Hollow Waveguide)
15. Millimeter Wave Transmission Structure: Eighth Example (Example of Modification of Mounting Structure)
16. Millimeter Wave Transmission Structure: Ninth Example (Example of Modification of Electronic Device)
<Radio Transmission System: First Embodiment>

Figure 1:
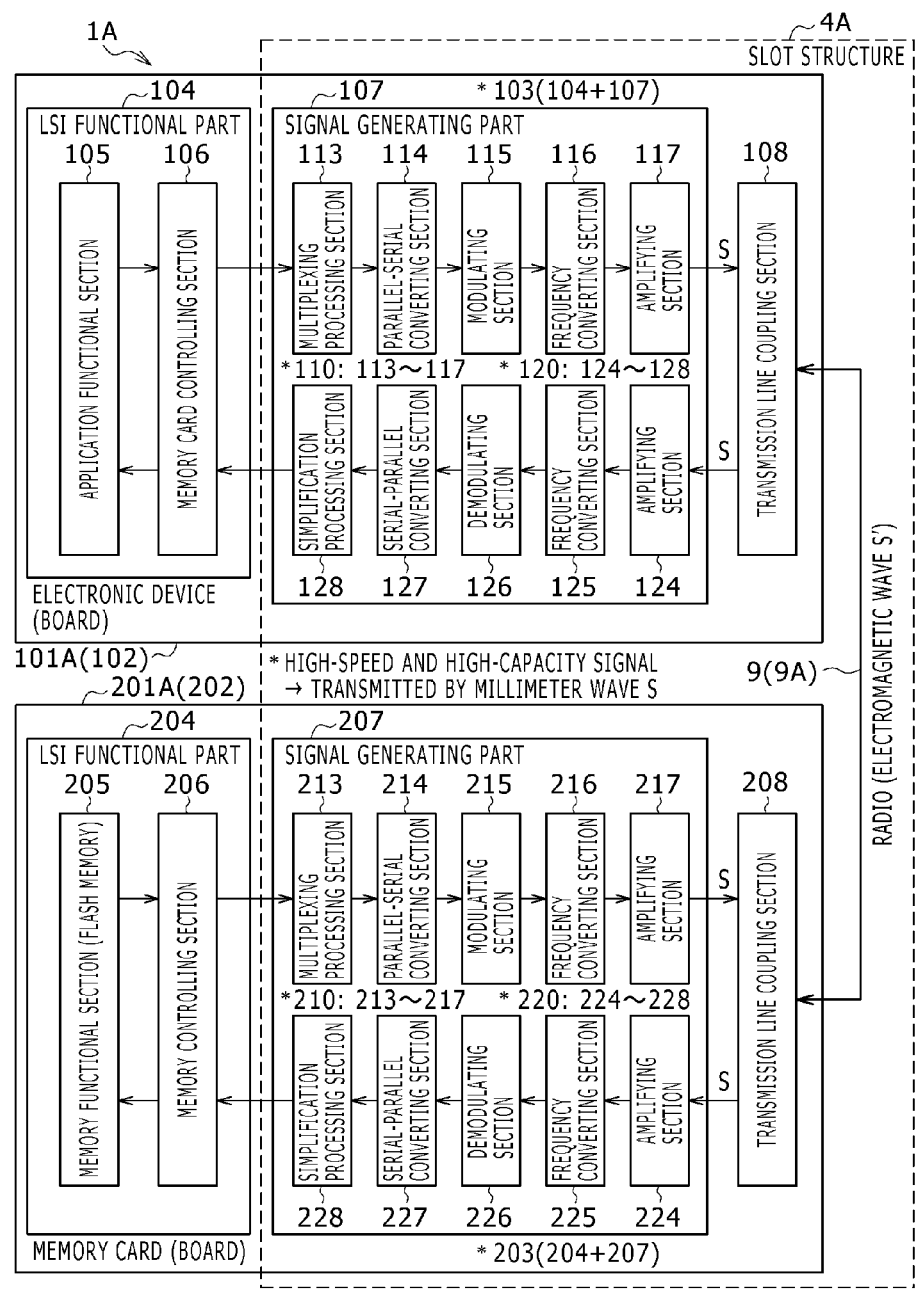
FIG. 1 is a diagram of assistance in explaining a signal interface in a radio transmission system according to a first embodiment from an aspect of functional configuration.
Figure 2A:
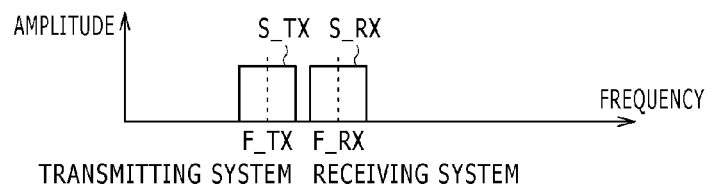
FIGS. 2A to 2C are diagrams of assistance in explaining signal multiplexing in the radio transmission system according to the first embodiment.
Figure 2B:
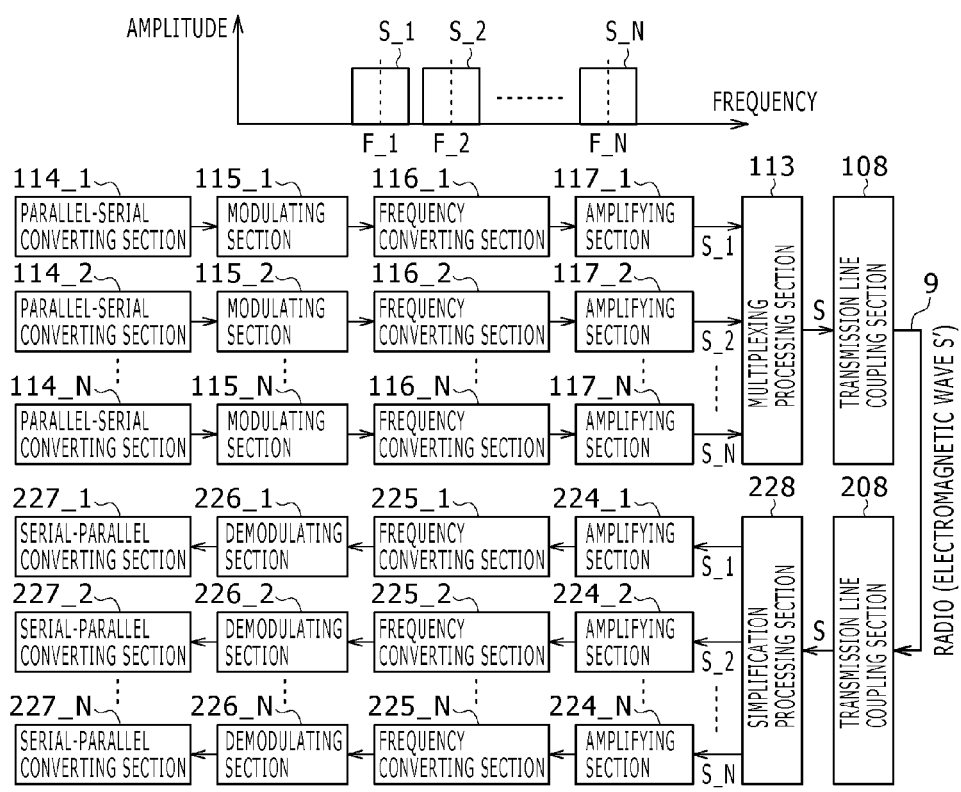
Figure 2C:
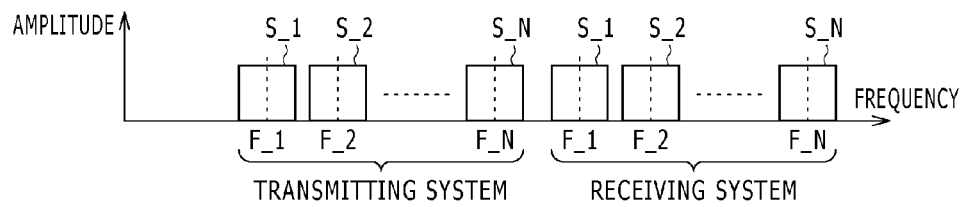
Figure 3:
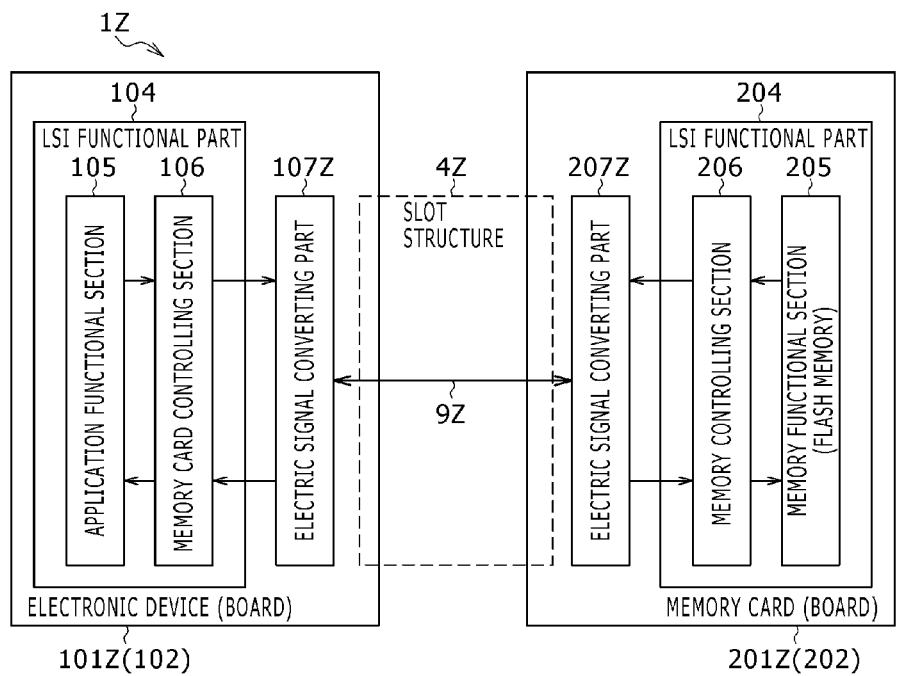
FIG. 3 is a diagram of assistance in explaining a signal interface in a signal transmission system according to a comparative example from an aspect of functional configuration.
Figure 4A:
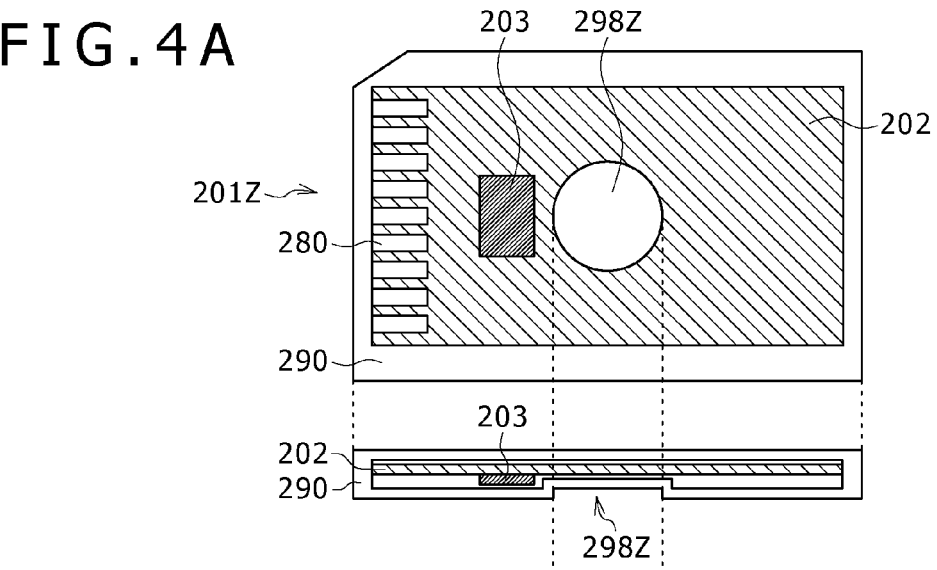
FIGS. 4A to 4C are diagrams of assistance in explaining an outline of a memory card applied to the signal transmission system according to the comparative example.
Figure 4B:
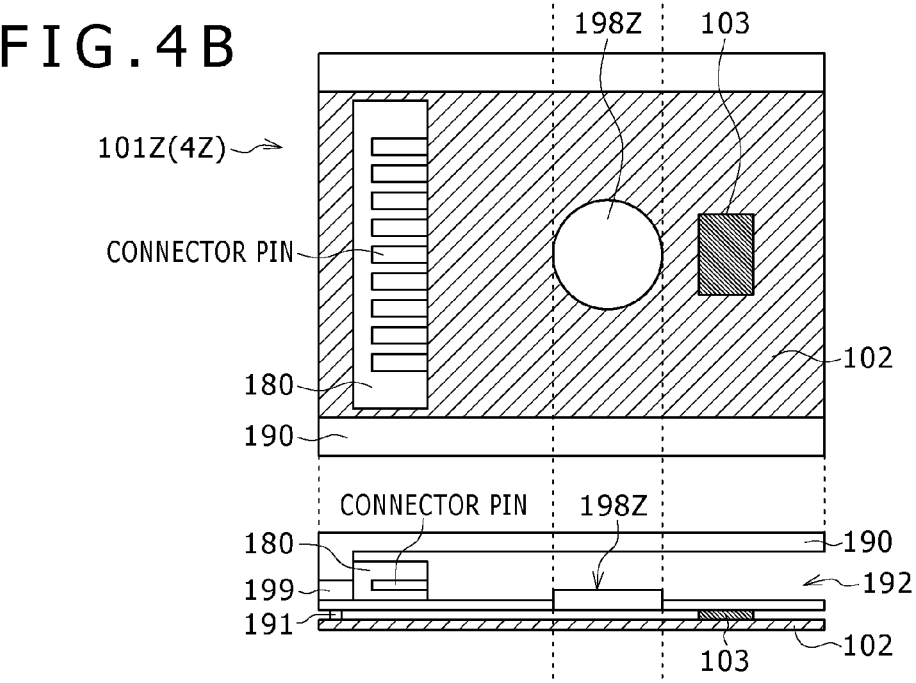
Figure 4C:
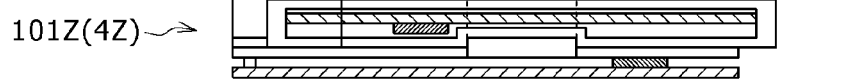

FIGS. 1 to 4C are diagrams of assistance in explaining a signal interface in a radio transmission system according to a first embodiment. FIG. 1 is a diagram of assistance in explaining the signal interface in the radio transmission system 1A according to the first embodiment from an aspect of functional configuration. FIGS. 2A to 2C are diagrams of assistance in explaining signal multiplexing in the radio transmission system 1A according to the first embodiment. FIGS. 3 to 4C are diagrams of assistance in explaining an example of comparison with the signal interface in the radio transmission system according to the present embodiment. FIG. 3 is a diagram of assistance in explaining a signal interface in a signal transmission system 1Z according to the comparative example from an aspect of functional configuration. FIGS. 4A to 4C are diagrams of assistance in explaining an outline of a memory card 201Z applied to the signal transmission system 1Z according to the comparative example.

Functional Configuration

First Embodiment

As shown in FIG. 1, the radio transmission system 1A according to the first embodiment is configured such that an electronic device 101A and a memory card 201A as an example of a card type information processing device are coupled to each other via a millimeter wave signal transmission line 9 and perform signal transmission in a millimeter wave band. A transmission object signal is frequency-converted into the millimeter wave band suitable for wide-band transmission, and then transmitted. The electronic device 101A is an example of a second electronic device having a slot structure. The memory card 201A is an example of a first electronic device.

The electronic device 101A has a function of reading and writing the memory card 201A. The electronic device 101A may be a card reading and writing device provided in the electronic device proper, or may be used as a card reading and writing device in combination with an electronic device proper such as a digital recording and reproducing device, a terrestrial television receiver, a portable telephone, a game machine, and a computer. In addition, the electronic device 101A may be a so-called converting adapter used when the slot structure of the card reading and writing device and the connector structure of the memory card 201A do not conform to each other.

The slot structure 4A (mounting structure) between the electronic device 101A and the memory card 201A is a structure for inserting and removing the memory card 201A into and from the electronic device 101A. The slot structure 4A has functions of means for connecting the millimeter wave signal transmission line 9 and means for fixing the electronic device 101A and the memory card 201A. The slot structure 4A and the memory card 201A have a structure in the form of a projection and a depression as a position defining section defining a state of mounting of the memory card 201A by a fitting structure.

The electronic device 101A has a semiconductor chip 103 capable of millimeter wave band communication. The memory card 201A also has a semiconductor chip 203 capable of millimeter wave band communication.

In the first embodiment, signals as objects of communication in the millimeter wave band are only signals desired to have a high-speed characteristic and a high-capacity characteristic, and other signals that need only a low speed and a low capacity and signals that can be considered to be a direct current such as power are not set as objects for conversion into a millimeter wave signal. For the signals (including power) not set as objects for conversion into a millimeter wave signal, electric wiring is drawn from LSI functional parts 104 and 204 to terminals, and an electric connection is established by mechanical contact via the terminals of both the electronic device 101A and the memory card 201A, as in the comparative example to be described later. Incidentally, original electric signals as objects for transmission before conversion into a millimeter wave will be referred to collectively as a baseband signal.

Data signals of movie video, computer images and the like, for example, correspond to data set as objects for conversion into a millimeter wave signal and desired to have a high-speed characteristic and a high-capacity characteristic. A millimeter wave transmission system is constructed by converting such data into a signal in the millimeter wave band whose carrier frequency is 30 GHz to 300 GHz and transmitting the signal at high speed. The electronic device 101A functioning as a main unit includes for example a digital recording and reproducing device, a terrestrial television receiver, a portable telephone, a game machine, a computer, a communicating device and the like.

[Electronic Device]

The electronic device 101A has the semiconductor chip 103 capable of millimeter wave band communication and a transmission line coupling section 108 mounted on a board 102. The semiconductor chip 103 is a system LSI (Large Scale Integrated Circuit) formed by integrating an LSI functional part 104 and a signal generating part 107 (millimeter wave signal generating section). Though not shown in the figure, a configuration may be made in which the LSI functional part 104 and the signal generating part 107 are not integrated. When the LSI functional part 104 and the signal generating part 107 are separate from each other, there is a fear of a problem caused by signal transmission between the LSI functional part 104 and the signal generating part 107 by electric wiring. The LSI functional part 104 and the signal generating part 107 are thus desirably formed integrally with each other.

The LSI functional part 104 has an application functional section 105 and a memory card controlling section 106. The signal generating part 107 and the transmission line coupling section 108 are configured to have data bidirectionality. The signal generating part 107 is thus provided with a signal generating section on a transmitting side and a signal generating section on a receiving side. While the transmission line coupling section 108 may have separate parts on the transmitting side and the receiving side, suppose in this case that the transmission line coupling section 108 is shared for both transmission and reception.

Incidentally, "bidirectional communication" in the first embodiment is single-core bidirectional transmission where the millimeter wave signal transmission line 9 as a millimeter wave transmission channel is one system (one core). In order to realize this, a half-duplex system to which time division multiplexing (TDD: Time Division Duplex) is applied, frequency division multiplexing (FDD: Frequency Division Duplex: FIGS. 2A to 2C), code division multiplexing or the like is applied.

In the case of time division multiplexing, separation of transmission and reception is performed on a time division basis, and thus "simultaneity of bidirectional communication (single-core simultaneous bidirectional transmission)" in which signal transmission from the electronic device 101 to the memory card 201 and signal transmission from the memory card 201 to the electronic device 101 are performed simultaneously is not achieved. Single-core simultaneous bidirectional transmission is achieved by frequency division multiplexing or code division multiplexing.

Because frequency division multiplexing uses different frequencies for transmission and reception as shown in FIG. 2A, the transmission bandwidth of the millimeter wave signal transmission line 9 needs to be widened.

Instead of mounting the semiconductor chip 103 directly on the board 102, a semiconductor package formed by mounting the semiconductor chip 103 on an interposer board and molding the semiconductor chip 103 by resin (for example epoxy resin) may be mounted on the board 102. That is, the interposer board forms a board for chip mounting, and the semiconductor chip 103 is disposed on the interposer board. It suffices to use a sheet member formed by combining for example a thermally toughened resin having a relative dielectric constant in a certain range (about 2 to 10) and a copper foil as the interposer board.

The semiconductor chip 103 is connected to the transmission line coupling section 108. For example an antenna structure including an antenna coupling section, an antenna terminal, a microstrip line, an antenna and the like is applied to the transmission line coupling section 108. Incidentally, the transmission line coupling section 108 can also be incorporated into the semiconductor chip 103 by applying a technique of forming an antenna directly on a chip.

The application functional section 105 performs main application control of the electronic device 101A. The application functional section 105 for example includes a circuit for processing images, audio data and the like desired to be transmitted to the other device and a circuit for processing images, audio data and the like received from the other device.

The memory card controlling section 106 performs logical control on the memory card 201A such as data read and write control, for example, in response to a request from the application functional section 105.

The signal generating part 107 (electric signal converting part) converts logical control data from the memory card controlling section 106 into a millimeter wave signal, and performs signal transmission control via the millimeter wave signal transmission line 9.

Specifically, the signal generating part 107 has a transmitting side signal generating section 110 and a receiving side signal generating section 120. The transmitting side signal generating section 110 and the transmission line coupling section 108 form a transmitting section. The receiving side signal generating section 120 and the transmission line coupling section 108 form a receiving section.

The transmitting side signal generating section 110 has a multiplexing processing section 113, a parallel-serial converting section 114, a modulating section 115, a frequency converting section 116, and an amplifying section 117 to subject an input signal to signal processing and generate a millimeter wave signal. Incidentally, the modulating section 115 and the frequency converting section 116 may be integrated into a so-called direct conversion system.

The receiving side signal generating section 120 has an amplifying section 124, a frequency converting section 125, a demodulating section 126, a serial-parallel converting section 127, and a simplification processing section 128 to subject a millimeter wave electric signal received by the transmission line coupling section 108 to signal processing and generate an output signal. The frequency converting section 125 and the demodulating section 126 may be integrated into a so-called direct conversion system.

The parallel-serial converting section 114 and the serial-parallel converting section 127 are provided in a case where the memory card 201A is made to parallel interface specifications using a plurality of data signals for parallel transmission. The parallel-serial converting section 114 and the serial-parallel converting section 127 are unnecessary in a case where the memory card 201A is made to serial interface specifications.

When there are a plurality of (N) kinds of signals as objects for communication in the millimeter wave band among signals from the memory card controlling section 106, the multiplexing processing section 113 integrates the plurality of kinds of signals into a signal of one system by performing multiplexing processing such as time division multiplexing, frequency division multiplexing, and code division multiplexing. In the case of the first embodiment, a plurality of kinds of signals desired to have a high-speed characteristic and a high-capacity characteristic are set as objects for transmission by a millimeter wave, and integrated into a signal of one system. Data signals first correspond to the plurality of kinds of signals desired to have a high-speed characteristic and a high-capacity characteristic, and then clock signals also correspond to the plurality of kinds of signals desired to have a high-speed characteristic and a high-capacity characteristic.

It is to be noted that, in the case of time division multiplexing or code division multiplexing, it suffices for the multiplexing processing section 113 to be provided in a stage preceding the parallel-serial converting section 114 and supply the integrated signal of one system to the parallel-serial converting section 114. In the case of time division multiplexing, it suffices to provide a selector switch for finely dividing time for a plurality of kinds of signals $\_@$ ($@$ is 1 to N) and supplying the signal to the parallel-serial converting section 114. In the case of code division multiplexing, it suffices to superimpose codes for distinguishing the plurality of kinds of signals $\_@$ and integrating the signals.

In the case of frequency division multiplexing, on the other hand, it is necessary to generate millimeter wave signals by converting the plurality of kinds of signals $\_@$ into frequencies in ranges of respective different frequency bands $F\_@$, as shown in FIG. 2B. Thus, for example, it is desirable to provide the parallel-serial converting section 114, the modulating section 115, the frequency converting section 116, and the amplifying section 117 for each of the plurality of kinds of signals $\_@$, and provide an addition processing section as the multiplexing processing section 113 in a stage following each amplifying section 117. Then, it suffices to supply the millimeter wave electric signals in frequency bands $F\_1 + \ldots + F\_N$ after frequency multiplexing processing to the transmission line coupling section 108.

As is understood from FIG. 2B, the transmission bandwidth needs to be widened in frequency division multiplexing that integrates signals of a plurality of systems into one system. As shown in FIG. 2C, the transmission bandwidth needs to be further widened in a case of using both the integration of signals of a plurality of systems into one system by frequency division multiplexing and a full-duplex system using different frequencies for transmission and reception.

The parallel-serial converting section 114 converts a parallel data signal into a serial data signal, and supplies the serial data signal to the modulating section 115. The modulating section 115 modulates the signal as an object for transmission, and supplies the modulated signal to the frequency converting section 116. It suffices for the modulating section 115 to modulate at least one of amplitude, frequency, and phase by the baseband signal, and a system using an arbitrary combination thereof can be adopted. For example, an analog modulating system includes amplitude modulation (AM) and vector modulation. Vector modulation includes frequency modulation (FM) and phase modulation (PM). A digital modulating system includes for example amplitude shift keying (ASK), frequency shift keying (FSK), phase shift keying (PSK), and amplitude phase shift keying. Amplitude phase shift keying includes quadrature amplitude modulation (QAM), for example.

The frequency converting section 116 generates a millimeter wave electric signal by frequency-converting the transmission object signal after being modulated by the modulating section 115, and then supplies the millimeter wave electric signal to the amplifying section 117. The millimeter wave electric signal refers to an electric signal of a certain frequency in a range of approximately 30 GHz to 300 GHz. The word "approximately" is used on the basis of a fact that it suffices for the frequency to be about such a frequency as to provide an effect of millimeter wave communication in the present embodiment, with a lower limit not limited to 30 GHz, and an upper limit not limited to 300 GHz.

The frequency converting section 116 can employ various circuit configurations. However, for example, it suffices for the frequency converting section 116 to employ a configuration including a mixing circuit (mixer circuit) and a local oscillator. The local oscillator generates a carrier wave (a carrier signal or a reference carrier wave) used for modulation. The mixing circuit generates a modulated signal in the millimeter wave band by multiplying (modulating) the carrier wave in the millimeter wave band which carrier wave is generated by the local oscillator by the signal from the parallel-serial converting section 114. The mixing circuit then supplies the modulated signal to the amplifying section 117.

The amplifying section 117 amplifies the millimeter wave electric signal after the frequency conversion, and then supplies the amplified millimeter wave electric signal to the transmission line coupling section 108. The amplifying section 117 is connected to the bidirectional transmission line coupling section 108 via an antenna terminal not shown in the figure.

The transmission line coupling section 108 transmits the millimeter wave signal generated by the transmitting side signal generating section 110 to the millimeter wave signal transmission line 9, and receives a millimeter wave signal from the millimeter wave signal transmission line 9 and outputs the millimeter wave signal to the receiving side signal generating section 120.

The transmission line coupling section 108 is formed by an antenna coupling section. The antenna coupling section forms an example or a part of the transmission line coupling section 108 (signal coupling section). The antenna coupling section in a narrow sense refers to a part for coupling an electronic circuit within a semiconductor chip to an antenna disposed within the chip or outside the chip, and in a broad sense refers to a part for signal coupling of the semiconductor chip to the millimeter wave signal transmission line.

For example, the antenna coupling section has at least an antenna structure. When transmission and reception is performed by time division multiplexing, the transmission line coupling section 108 is provided with an antenna switching section (antenna duplexer).

The antenna structure refers to a structure in a coupling section on the memory card 201A side sharing the millimeter wave signal transmission line 9. It suffices for the antenna structure to couple an electric signal in the millimeter wave band to the millimeter wave signal transmission line 9, and the antenna structure does not mean only an antenna itself. For example, the antenna structure includes an antenna terminal, a microstrip line, and an antenna. When the antenna switching section is formed within the same chip, the antenna terminal and the microstrip line excluding the antenna switching section form the transmission line coupling section 108.

The antenna has a length based on the wavelength λ (for example about 600 μm) of a millimeter wave signal, and is coupled to the millimeter wave signal transmission line 9. Used as the antenna is a probe antenna (dipole or the like), a loop antenna, or a small aperture coupling element (slot antenna or the like) in addition to a patch antenna.

When the antenna on the electronic device 101A side and the antenna on the memory card 201A side are arranged so as to be opposed to each other in a state of the memory card 201A being housed within the electronic device 101A, it suffices for the antennas to be nondirectional antennas. When the antennas are arranged so as to be displaced from each other in planar terms, directional antennas are used as the antennas, or it is desirable to use a device such as changing the traveling direction of the millimeter wave signal from a direction of thickness of the board to a planar direction using a reflecting member or providing a dielectric transmission line for making the millimeter wave signal travel in the planar direction, for example.

The antenna on the transmitting side radiates an electromagnetic wave based on a millimeter wave signal to the millimeter wave signal transmission line 9. The antenna on the receiving side receives an electromagnetic wave based on a millimeter wave signal from the millimeter wave signal transmission line 9. The microstrip line establishes a connection between the antenna terminal and the antenna. The microstrip line transmits a millimeter wave signal on the transmitting side from the antenna terminal to the antenna, and transmits a millimeter wave signal on the receiving side from the antenna to the antenna terminal.

The antenna switching section is used when the antenna is shared for transmission and reception. For example, when a millimeter wave signal is transmitted to the side of the memory card 201A as the other device, the antenna switching section connects the antenna to the transmitting side signal generating section 110. When a millimeter wave signal from the side of the memory card 201A as the other device is received, the antenna switching section connects the antenna to the receiving side signal generating section 120. The antenna switching section is disposed on the board 102 separately from the semiconductor chip 103, but is not limited to this. The antenna switching section may be disposed within the semiconductor chip 103. The antenna switching section can be omitted when an antenna for transmission and an antenna for reception are provided separately from each other.

Suppose that the millimeter wave signal transmission line 9 as a millimeter wave propagating path may be a free space transmission line and is preferably formed by a waveguide, a transmission line, a dielectric line, or a waveguide structure within a dielectric or the like, and that the millimeter wave signal transmission line 9 has a characteristic of transmitting an electromagnetic wave in the millimeter wave band efficiently. For example, the millimeter wave signal transmission line 9 in the first embodiment is a dielectric transmission line 9A formed including a dielectric material having a relative dielectric constant in a certain range and a dielectric loss tangent in a certain range.

It suffices for the "certain ranges" of the relative dielectric constant and the dielectric loss tangent of the dielectric material to be a range such that effects of the present embodiment can be obtained, and it suffices for the certain ranges to be ranges of predetermined values as long as the effects of the present embodiment can be obtained. That is, it suffices for the dielectric material to be able to transmit millimeter wave signals having characteristics such that the effects of the present embodiment can be obtained. The relative dielectric constant and the dielectric loss tangent of the dielectric material cannot be determined by the dielectric material itself, and cannot necessarily be determined definitely because the relative dielectric constant and the dielectric loss tangent of the dielectric material also have relation to the length of the transmission line and the frequency of millimeter waves.

However, as an example, the relative dielectric constant and the dielectric loss tangent of the dielectric material are as follows.

For high-speed transmission of millimeter wave signals within the dielectric transmission line, it is desirable that the relative dielectric constant of the dielectric material be about 2 to 10 (preferably 3 to 6) and that the dielectric loss tangent of the dielectric material be about 0.00001 to 0.01 (preferably 0.00001 to 0.001). For example, dielectric materials formed of an acrylic resin base, a urethane resin base, an epoxy resin base, a silicone base, a polyimide base, and a cyanoacrylate resin base can be used as dielectric materials satisfying such conditions. Such ranges of the relative dielectric constant and the dielectric loss tangent of the dielectric material are the same in the present embodiment unless otherwise specified. Incidentally, the millimeter wave signal transmission line 9 formed so as to confine a millimeter wave signal in the transmission line may not only be the dielectric transmission line but also be a hollow waveguide, the periphery of the transmission line being enclosed by a shielding material and the inside of the transmission line being hollow.

The transmission line coupling section 108 is connected with the receiving side signal generating section 120. The receiving side signal generating section 120 has an amplifying section 124, a frequency converting section 125, a demodulating section 126, a serial-parallel converting section 127, and a simplification processing section 128 to subject a millimeter wave electric signal received by the transmission line coupling section 108 to signal processing and generate an output signal. Incidentally, the frequency converting section 125 and the demodulating section 126 may be integrated into a so-called direct conversion system.

The amplifying section 124 is connected to the transmission line coupling section 108. The amplifying section 124 amplifies a millimeter wave electric signal after being received by the antenna, and then supplies the amplified millimeter wave electric signal to the frequency converting section 125. The frequency converting section 125 frequency-converts the millimeter wave electric signal after the amplification, and then supplies the signal after the frequency conversion to the demodulating section 126. The demodulating section 126 demodulates the signal after the frequency conversion, thereby obtains a baseband signal, and then supplies the baseband signal to the serial-parallel converting section 127.

The serial-parallel converting section 127 converts the serial received data into parallel output data, and then supplies the parallel output data to the simplification processing section 128.

The simplification processing section 128 corresponds to the multiplexing processing section 113. The simplification processing section 128 separates the signal integrated in one system into a plurality of kinds of signals _@ (@ is 1 to N). In the case of the first embodiment, for example, the simplification processing section 128 separates the plurality of data signals integrated in the signal of one system into each separate data signal, and then supplies each separate data signal to the memory card controlling section 106.

Incidentally, when the signals are integrated into one system by frequency division multiplexing, the millimeter wave electric signals in frequency bands F_1+ . . . +F_N after frequency multiplexing processing need to be received and processed in the separate frequency bands F_@. Thus, as shown in FIG. 2B, it is desirable to provide amplifying sections 224, frequency converting sections 225, demodulating sections 226, and serial-parallel converting sections 227 separately for the plurality of kinds of signals _@, and provide a frequency separating section as simplification processing section 228 in a stage preceding each amplifying section 224. Then, it suffices to supply the millimeter wave electric signal in each frequency band F_@ after separation to the system of the corresponding frequency band F_@.

When the semiconductor chip 103 is thus formed, the number of signals as objects for millimeter wave conversion is reduced by subjecting an input signal to parallel-serial conversion and transmitting the result to the semiconductor chip 203 side, and subjecting a received signal from the semiconductor chip 203 side to serial-parallel conversion.

Incidentally, when original signal transmission between the electronic device 101A and the memory card 201A is in a serial form, the parallel-serial converting section 114 and the serial-parallel converting section 127 do not need to be provided.

[Memory Card]

The memory card 201A has a substantially similar functional configuration to that of the electronic device 101A. Each functional part is identified by a reference having a numeral 2 as a third (hundreds) digit, and similar and like functional parts to those of the electronic device 101A are identified by references having the same second (tens) and first (units) digits as in the electronic device 101A. The transmitting side signal generating section 210 and the transmission line coupling section 208 form a transmitting section. The receiving side signal generating section 220 and the transmission line coupling section 208 form a receiving section.

The memory card 201A is different from the electronic device 101A in that the application functional section 105 is replaced with a memory functional section 205 and the memory card controlling section 106 is replaced with a memory controlling section 206.

The memory functional section 205 is a nonvolatile storage medium provided by a flash memory or a hard disk, for example.

The memory controlling section 206 performs data read and write control on the memory functional section 205 in response to logical control data from the electronic device 101A side.

A signal generating part 207 (an electric signal converting section and a baseband signal generating section) converts a millimeter wave signal representing logical control data from the memory card controlling section 106 side which millimeter wave signal is received via the millimeter wave signal transmission line 9 into the original logical control data (baseband signal). The signal generating part 207 then supplies the original logical control data (baseband signal) to the memory controlling section 206.

The memory card 201A is a detachable semiconductor recording medium mainly including a flash memory. The memory card 201A performs data read/write from the electronic device 101A. The memory card 201A may have a non-standardized arbitrary shape, or may have a standardized shape. There are various standards, as is well known. Regardless of whether the memory card 201A is a non-standard product or a standard product, higher speed of the interface is desired as the capacity of the memory card is increased.

A method of frequency-converting an input signal and performing signal transmission is commonly used in broadcasting and radio communication. In these applications, relatively complex transmitters and receivers and the like capable of dealing with problems of how far communication can be attained (problem of S/N with respect to thermal noise), how to cope with reflection and multiple paths, and how to suppress disturbance and interference with other channels, for example, are used. On the other hand, the signal generating parts 107 and 207 used in the present embodiment are used in the millimeter wave band of a higher frequency band than usable frequencies of complex transmitters and receivers and the like commonly used in broadcasting and radio communication. Because of short wavelength λ, frequency reuse is easily made, and signal generating sections suitable for performing communication between many adjacent devices are used.

[Demodulating Functional Part]

The frequency converting section 125 and the demodulating section 126 can employ various circuit configurations. However, the frequency converting section 125 and the demodulating section 126 can use a square-law detecting circuit providing a detection output proportional to the square of amplitude of a received millimeter wave signal (envelope), for example.

When multiple channels are realized by a frequency division multiplexing system, the system using the square-law detecting circuit has the following difficulties. First, in realizing multiple channels by this system, a band-pass filter for frequency selection on the receiving side needs to be disposed in a stage preceding the square-law detecting circuit, but it is not easy to realize a steep band-pass filter in small size. In addition, the square-law detecting circuit is disadvantageous in terms of sensitivity, and is affected by a frequency variation component of a carrier wave in realizing multiple channels by the frequency division multiplexing system. Thus, strict specifications are required also for stability of the carrier wave on the transmitting side, and the modulating system is limited to a system such that effects of frequency variations can be ignored (for example OOK: On-Off Keying) or the like.

In addition, the oscillating circuit has the following difficulties. When an ordinary method as used in outdoor radio communication is to be used on the transmitting side and the receiving side in transmitting data by the millimeter wave, stability is required of the carrier wave, and a highly stable millimeter wave oscillator whose frequency stability is on the order of ppm (parts per million) is required. When a millimeter wave oscillator of high stability is to be implemented on a silicon integrated circuit (CMOS: Complementary Metal Oxide Semiconductor), because a silicon substrate used in ordinary CMOS has a low insulation quality, a high-Q tank circuit cannot be formed easily, and the millimeter wave oscillator of high stability is not implemented easily. For example, when an inductance is formed on a CMOS chip, the Q is about 30 to 40.

Thus, in general, to realize an oscillator of high stability as required in radio communication, there is no choice but to adopt a method of forming a high-Q tank circuit by a crystal oscillator or the like outside the CMOS at a low frequency, multiplying the oscillation output, and thereby raising the oscillation output to the millimeter wave band. However, it is not desirable to provide such an external tank to all chips in order to realize a function of replacing signal transmission by wiring for LVDS (Low Voltage Differential Signaling) or the like with signal transmission by the millimeter wave.

As a measure against such problems, the frequency converting section 125 and the demodulating section 126 preferably employ an injection locking system. When the injection locking system is employed, a reference carrier wave, which corresponds to a carrier signal used for modulation and is used as a reference for injection locking on the receiving side, is sent out in conjunction with a signal modulated into the millimeter wave band from the transmitting side. The reference carrier signal is typically a carrier signal itself used for modulation, but is not limited to this. The reference carrier signal may be a signal of another frequency (for example a harmonic signal) which signal is synchronized with a carrier signal used for modulation, for example.

A local oscillator is provided on the receiver side. A transmitted reference carrier wave component is injection-locked into the local oscillator. A transmitted transmission object signal is reconstructed using the output signal of the local oscillator. For example, the received signal is input to the local oscillator for synchronization with the reference carrier wave. The reference carrier wave and the received signal are input to a mixing circuit to generate a multiplication signal. A high-frequency component of the multiplication signal is removed by a low-pass filter, whereby the waveform of an input signal (baseband signal) transmitted from the transmitting side is obtained.

By thus using injection locking, the local oscillator on the receiving side may have a low Q, and required specifications for stability of the reference carrier wave on the transmitting side can be relaxed. Thus, a receiving function can be realized simply even with a higher carrier frequency. The local oscillator on the receiving side reproduces a signal synchronized with the reference carrier wave on the transmitting side, and supplies the signal to the mixing circuit. Then synchronous detection is performed. Thus, it is not necessary to provide a band-pass filter (frequency selecting filter) in a stage preceding the mixing circuit. In addition, on the receiver side, the receiving side local oscillator can be formed by providing a tank circuit on a semiconductor chip without a tank circuit being used outside the semiconductor chip of a CMOS configuration. A transmitted millimeter wave modulated signal is demodulated using an output signal obtained by supplying a reference carrier signal component transmitted from the transmitting side to the receiving side local oscillator and thereby injection-locking the reference carrier signal component transmitted from the transmitting side into the receiving side local oscillator, so that a transmitted input signal can be reconstructed.

Connection and Operation

First Embodiment

As shown in FIG. 1, the slot structure 4A according to the first embodiment contributes to the signal generating part 107 and the transmission line coupling section 108 on the electronic device 101A side, the signal generating part 207 and the transmission line coupling section 208 on the memory card 201A side, and the millimeter wave signal transmission line 9 (dielectric transmission line 9A). The dielectric transmission line 9A is provided between the transmission line coupling section 108 and the transmission line coupling section 208.

Incidentally, unlike a signal interface using related-art electric wiring, the present embodiment flexibly provides for a high-speed characteristic and high capacity by performing signal transmission in the millimeter wave band as described above. For example, in the first embodiment, only signals desired to have a high-speed characteristic and a high-capacity characteristic are set as objects for communication in the millimeter wave band, and the electronic device 101A and the memory card 201A have, in a part thereof, an interface (connection by a terminal or a connector) using related-art electric wiring for low-speed and low-capacity signals and for power supply. A clock signal and a plurality of data signals are objects for signal transmission by the millimeter wave, so that terminals therefor can be removed.

The signal generating part 107 generates a millimeter wave signal by subjecting an input signal input from the memory card controlling section 106 to signal processing. The signal generating part 107 is connected to the transmission line coupling section 108 by a transmission line such as a microstrip line, a strip line, a coplanar line, or a slot line, for example. The generated millimeter wave signal is supplied to the dielectric transmission line 9A as the millimeter wave signal transmission line 9 via the transmission line coupling section 108.

The transmission line coupling section 108 has an antenna structure. The transmission line coupling section 108 has a function of converting the transmitted millimeter wave signal into an electromagnetic wave and sending out the electromagnetic wave. The transmission line coupling section 108 is coupled to the dielectric transmission line 9A as the millimeter wave signal transmission line 9. The electromagnetic wave converted by the transmission line coupling section 108 is supplied to one end part of the dielectric transmission line 9A. The transmission line coupling section 208 on the side of the memory card 201A is coupled to another end of the dielectric transmission line 9A. By providing the dielectric transmission line 9A between the transmission line coupling section 108 on the side of the electronic device 101A and the transmission line coupling section 208 on the side of the memory card 201A, the electromagnetic wave in the millimeter wave band propagates through the dielectric transmission line 9A.

The transmission line coupling section 208 on the side of the memory card 201A is coupled to the dielectric transmission line 9A. The transmission line coupling section 208 receives the electromagnetic wave transmitted to the other end of the dielectric transmission line 9A, converts the electromagnetic wave into a millimeter wave signal, and then supplies the millimeter wave signal to the signal generating part 207. The signal generating part 207 subjects the converted millimeter wave signal to signal processing, thereby generates an output signal, and then supplies the output signal to the memory functional section 205.

The above description has been made of a case of signal transmission from the electronic device 101A to the memory card 201A. However, it suffices to similarly consider a case of transmitting data read from the memory functional section 205 in the memory card 201A to the electronic device 101A. Millimeter wave signals can be transmitted bidirectionally.

Functional Configuration

Comparative Example

As shown in FIG. 3, the signal transmission system 1Z according to the comparative example is configured such that an electronic device 101Z and a memory card 201Z are coupled to each other via an electric interface 9Z to perform signal transmission. The electronic device 101Z has a semiconductor chip 103Z capable of signal transmission via electric wiring. The memory card 201Z also has a semiconductor chip 203Z capable of signal transmission via electric wiring. In this configuration, the millimeter wave signal transmission line 9 according to the first embodiment is replaced with the electric interface 9Z.

The memory card 201Z reads and writes data from the electronic device 101Z. There are various specifications for the memory card. Higher interface speed is desired with increases in capacity. A certain standard product, for example, has achieved a physical transmission rate of 480 Mbps by parallel transmission of 8 terminals×60 MHz.

When this memory card 201Z is used, the electronic device 101Z generally has a slot structure to connect the memory card 201Z to the electric interface 9Z. The slot structure also has a function of means for fixing the memory card 201Z.

In order to perform signal transmission via the electric wiring, the electronic device 101Z has an electric signal converting part 107Z in place of the signal generating part 107 and the transmission line coupling section 108, and the memory card 201Z has an electric signal converting part 207Z in place of the signal generating part 207 and the transmission line coupling section 208.

The electric signal converting part 107Z in the electronic device 101Z controls electric signal transmission via the electric interface 9Z for logical control data of the memory card controlling section 106.

On the other hand, the electric signal converting part 207Z in the memory card 201Z is accessed via the electric interface 9Z, and obtains the logical control data transmitted from the memory card controlling section 106.

The slot structure 4Z between the electronic device 101Z and the memory card 201Z is a structure for inserting and detaching the memory card 201Z into and from the electronic device 101Z. The slot structure 4Z has functions of means for connecting the electric interface 9Z and means for fixing the electronic device 101Z and the memory card 201Z.

As shown in FIG. 4B, the slot structure 4Z has an elastic member 199 (for example a spring mechanism) in a part of a casing 190, and is formed such that the memory card 201Z can be inserted into and removed from the casing 190 on the side of the electronic device 101Z from an opening part 192 and fixed to the casing 190. The electronic device 101Z and the memory card 201Z have depression and projection shape configurations as a fitting structure. The depression shape configuration may be arbitrarily provided to one of the electronic device 101Z and the memory card 201Z, and the projection shape configuration may be arbitrarily provided to the other. In this case, as shown in FIG. 4B, the casing 190 of the electronic device 101Z has a projection shape configuration 198Z (protrusion), and as shown in FIG. 4A, the casing 290 of the memory card 201Z has a depression shape configuration 298Z (hollow). That is, as shown in FIG. 4C, the projection shape configuration 198Z is disposed in a part corresponding to the position of the depression shape configuration 298Z when the memory card 201Z is inserted in the casing 190.

As shown in FIG. 4A, a connecting terminal 280 (signal pin) for being connected to the electronic device 101Z as an external device at a determined position of the casing 290 is disposed at the determined position of the casing 290 at one side of a board 202. The connecting terminal 280 is connected to the electric signal converting part 207Z via a wiring pattern and a conductive via. The electronic device 101Z has a connecting section 180 (connector) to be connected to the connecting terminal 280 of the memory card 201Z so as to correspond to the connecting terminal 280. When the memory card 201Z is inserted into the casing 190 of the electronic device 101Z, the connector pin of the connecting section 180 and the connecting terminal 280 are brought into mechanical contact with each other to establish an electrical connection. Thereby, the memory card 201Z is connected to the electronic device 101Z, and power supply and transmission of input and output signals, for example, are performed.

The signal transmission system 1Z according to the comparative example employing the electric interface 9Z has the following problems.

i) While higher capacity and higher speed of transmission data are desired, there is a limit to the transmission speed and transmission capacity of electric wiring.

ii) In order to deal with the problem of increasing the speed of transmission data, transmission speed per signal line may be decreased by increasing the number of pieces of wiring and thus achieving signal parallelization. However, this measure leads to an increase of input and output terminals. As a result, complication of a printed board and cable wiring, an increase in physical size of the connector part and the electric interface 9Z, and the like are required, and there occur problems such as complication of shape of these parts, degradation in reliability of the parts, and an increase in cost, for example.

iii) As the band of the baseband signal is widened with swelling of an amount of information of movie video, computer images and the like, the problem of electromagnetic compatibility (EMC) becomes more obvious. For example, when electric wiring is used, the wiring becomes an antenna, and interferes with signals corresponding to the tuning frequency of the antenna. In addition, reflection and resonance due to a mismatch of impedance of the wiring or the like are causes of spurious radiation. Resonance and reflection tend to be accompanied by radiation, and make the problem of EMI (electromagnetic interference) serious. The configuration of the electronic device is complicated to take measures against such problems.

iv) In addition to EMC and EMI, when there is reflection, a transmission error due to interference between symbols on the receiving side and a transmission error due to the jumping in of disturbance become problems.

v) When the terminals are made bare, there is a problem of electrostatic breakdown.

On the other hand, by replacing the electric signal converting part 107Z and 207Z according to the comparative example with the signal generating parts 107 and 207 and the transmission line coupling sections 108 and 208, the radio transmission system 1A according to the first embodiment performs signal transmission by a millimeter wave rather than electric wiring. Logical control data from the memory card controlling section 106 to the memory controlling section 206 is converted into a millimeter wave signal, and the millimeter wave signal is transmitted between the transmission line coupling sections 108 and 208 via the dielectric transmission line 9A.

Because of radio transmission, it is not necessary to care about the shape of wiring and the position of connectors, and thus there occurs no particular limitation on layout. Wiring and terminals for signals replaced by signal transmission by millimeter waves can be omitted, so that the problems of EMC and EMI are solved and the problem of electrostatic breakdown is also solved. Generally, there is no other functional part using frequencies in the millimeter wave band within the electronic device 101A and the memory card 201A, and therefore measures against EMC and EMI can be realized easily.

In particular, the first embodiment adopts a configuration that confines a millimeter wave signal in the dielectric transmission line 9A, so that radiation and interference of the radio wave can be suppressed and transmission efficiency can be improved effectively. That is, the millimeter wave signal is transmitted in a specific mode within the dielectric transmission line 9A, so that millimeter wave signal transmission suppressing attenuation and radiation can be performed. Advantages of suppressing external radiation of the millimeter wave and more facilitating EMC measures, for example, are also obtained.

In addition, because radio transmission is performed in a state of the memory card 201A being mounted in the slot structure 4A, and signal transmission is performed between fixed positions and in known positional relation, the following advantages are obtained.

1) It is easy to properly design a propagation channel (waveguide structure) between the transmitting side and the receiving side.

2) Excellent transmission with higher reliability than free space transmission (free space transmission line 9B in the second example) is made possible by designing the dielectric structure of the transmission line coupling sections sealing the transmitting side and the receiving side and the propagation channel (waveguide structure of the millimeter wave signal transmission line 9=dielectric transmission line 9A) in conjunction with each other.

3) The control of a controller for managing radio transmission (memory card controlling section 106 in the present example) does not need to be performed dynamically or adaptively with high frequency like ordinary radio communication, so that control overhead can be reduced as compared with ordinary radio communication. As a result, miniaturization, lower power consumption, and higher speed can be achieved.

4) When a radio transmission environment is calibrated at a time of manufacturing or at a time of design, and individual variations and the like are grasped, communication of higher quality is made possible by referring to and transmitting the data.

5) Even when reflection is present, the reflection is a fixed reflection, so that effects of the reflection can be easily eliminated by a small equalizer on the receiving side. A setting of the equalizer can be made by a preset or static control, and can thus be attained easily.

In addition, millimeter wave communication provides the following advantages.

a) Because millimeter wave communication provides a wide communication band, a high data rate can be achieved easily.

b) Frequencies used for transmission can be separated from frequencies of other baseband signal processing. Thus, interference between the frequencies of a millimeter wave and a baseband signal do not occur easily, and space division multiplexing to be described later is achieved easily.

c) Because the millimeter wave band has short wavelengths, the antenna and the waveguide structure determined according to wavelength can be made smaller. In addition, because of great distance attenuation and a little diffraction of the millimeter wave band, electromagnetic shielding is provided easily.

d) There are strict regulations for ordinary radio communication in regard to the stability of carrier waves to prevent interference and the like. In order to realize a carrier wave of such high stability, an external frequency reference part of high stability, a multiplying circuit, a PLL (phase-locked loop circuit) and the like are used, thus increasing circuit scale. However, with the millimeter wave (especially when used in conjunction with signal transmission between fixed positions or in known positional relation), it is possible to shield the millimeter wave easily, prevent a leakage of the millimeter wave to the outside, use a carrier wave of low stability for transmission, and thus prevent an increase in circuit scale. An injection locking system is suitably adopted to demodulate a signal transmitted by a carrier wave of relaxed stability by a small circuit on the receiving side.

Incidentally, a method of changing electric wiring to radio and performing transmission by a UWB (Ultra Wide Band) has been proposed. For example, Patent Document 1 describes applying a radio interface to the memory card.

Standards such for example as IEEE802.11a/b/g using a 2.4-GHz band and a 5-GHz band are applied to communication. However, a radio interface in the 2.4-GHz band or the 5-GHz band is applied to a memory card, data access is made from an electronic device via an electric interface, and data access is made from a different electronic device via the radio interface, which is different from the mechanism of the first embodiment.

Patent Document 2 describes an extension of the mechanism of Patent Document 1, where a single or a plurality of antenna patterns corresponding to a plurality of frequency bands of various standards are provided on the plane of a card. Patent Document 2 also refers to a memory card configured by only radio access with an electric interface being removed, that is, the configuration of a memory card having only a radio interface. However, Patent Document 2 does not mention substitution for related-art electric interfaces, and is different from the mechanism of the first embodiment.

In addition, when complying with standards to which the UWB is applied such as IEEE802.11a/b/g as in Patent Documents 1 and 2, carrier frequency is low, and is not suitable for high-speed communication such as transmission of a video signal, for example, and there is a problem in size such as an increase in antenna size. Further, because frequencies used for transmission are close to frequencies of other baseband signal processing, interference tends to occur, and it is difficult to realize space division multiplexing to be described later.

Radio Transmission System

Second Embodiment

FIG. 5 is a diagram of assistance in explaining a signal interface in a radio transmission system according to a second embodiment. FIG. 5 is a diagram of assistance in explaining the signal interface in the radio transmission system 1B according to the second embodiment from an aspect of functional configuration.

The second embodiment makes a millimeter wave signal transmission line 9 a substantial free space. The "substantial free space" means that while the casings of an electronic device 101B and a memory card 201B are a dielectric, a millimeter wave signal is transmitted between the electronic device 101B and the memory card 201B via a transmission line of a free space (free space transmission line 9B) ignoring the dielectric parts.

In terms of functional configuration, only the dielectric transmission line 9A according to the first embodiment is replaced with the free space transmission line 9B, and the second embodiment is similar to the first embodiment in other parts. Therefore description of the other parts will be omitted.

When the free space transmission line 9B is applied, millimeter wave signals are not confined in the millimeter wave signal transmission line 9. However, the millimeter wave band has short wavelengths of about 1 mm to 10 mm in the air. Thus, the millimeter wave easily attenuates and does not cause diffraction easily, and directionality can be imparted to the radio wave by narrowing the directionality of the radio wave to a specific direction. Even when millimeter wave signals are not confined by using the dielectric transmission line 9A or the like, transmission efficiency can be improved, and wiring and terminals for signals replaced by signal transmission by the millimeter wave can be omitted, so that the problems of EMC, EMI, and electrostatic breakdown are solved. With the mechanism of the second embodiment, the dielectric transmission line 9A does not need to be formed, and thus manufacturing is easy and cost is lower than the first embodiment.

Radio Transmission System

Third Embodiment

Figure 6:
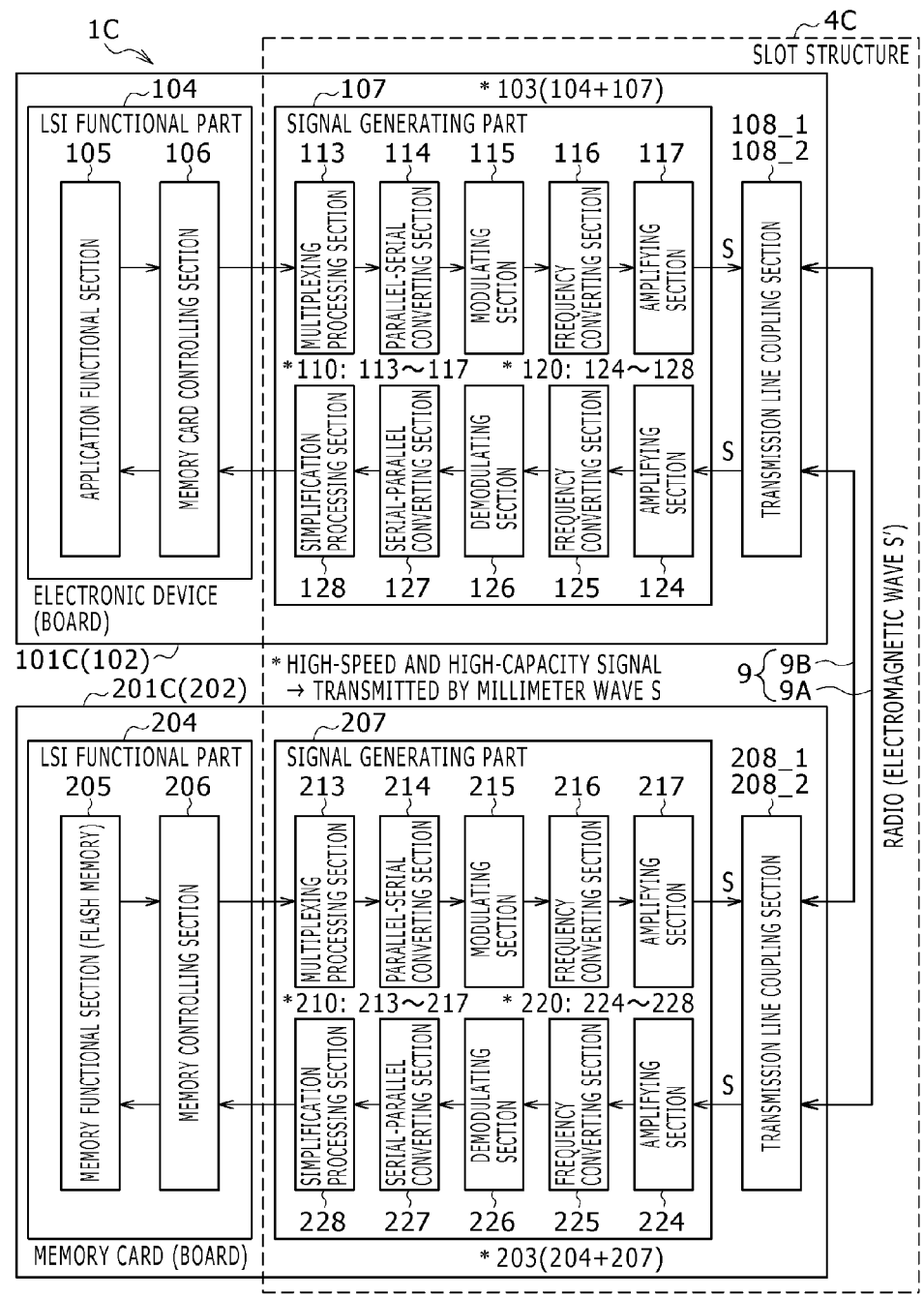
FIG. 6 is a diagram of assistance in explaining a signal interface in a radio transmission system according to a third embodiment from an aspect of functional configuration.

FIG. 6 is a diagram of assistance in explaining a signal interface in a radio transmission system according to a third embodiment. FIG. 6 is a diagram of assistance in explaining the signal interface in the radio transmission system 1C according to the third embodiment from an aspect of functional configuration.

The third embodiment applies both the dielectric transmission line 9A according to the first embodiment and the free space transmission line 9B according to the second embodiment as the millimeter wave signal transmission line 9. In terms of functional configuration, the third embodiment is a mere combination of the first embodiment and the second embodiment. Therefore description of other parts will be omitted.

The mechanism of the third embodiment has two systems as millimeter wave signal transmission line 9, and the concept also corresponds to an example of "space division multiplexing" in a fifth embodiment to be described later. While one system of the dielectric transmission line 9A and one system of the free space transmission line 9B are provided in FIG. 6, there may be two or more systems of each of the dielectric transmission line 9A and the free space transmission line 9B.

As is presumed from comparison between the first and second embodiments, it is more desirable to apply the dielectric transmission line 9A than the free space transmission line 9B from a viewpoint of improving transmission efficiency effectively. However, when a plurality of (N) transmission channels (millimeter wave signal transmission lines 9_N) are prepared, it may be structurally difficult to provide the dielectric transmission line 9A at a plurality of positions. In such a case, the mechanism of the third embodiment can make a provision for a plurality of transmission channels by applying the free space transmission line 9B to a transmission channel for which the dielectric transmission line 9A cannot be provided.

Radio Transmission System

Fourth Embodiment

Figure 7:
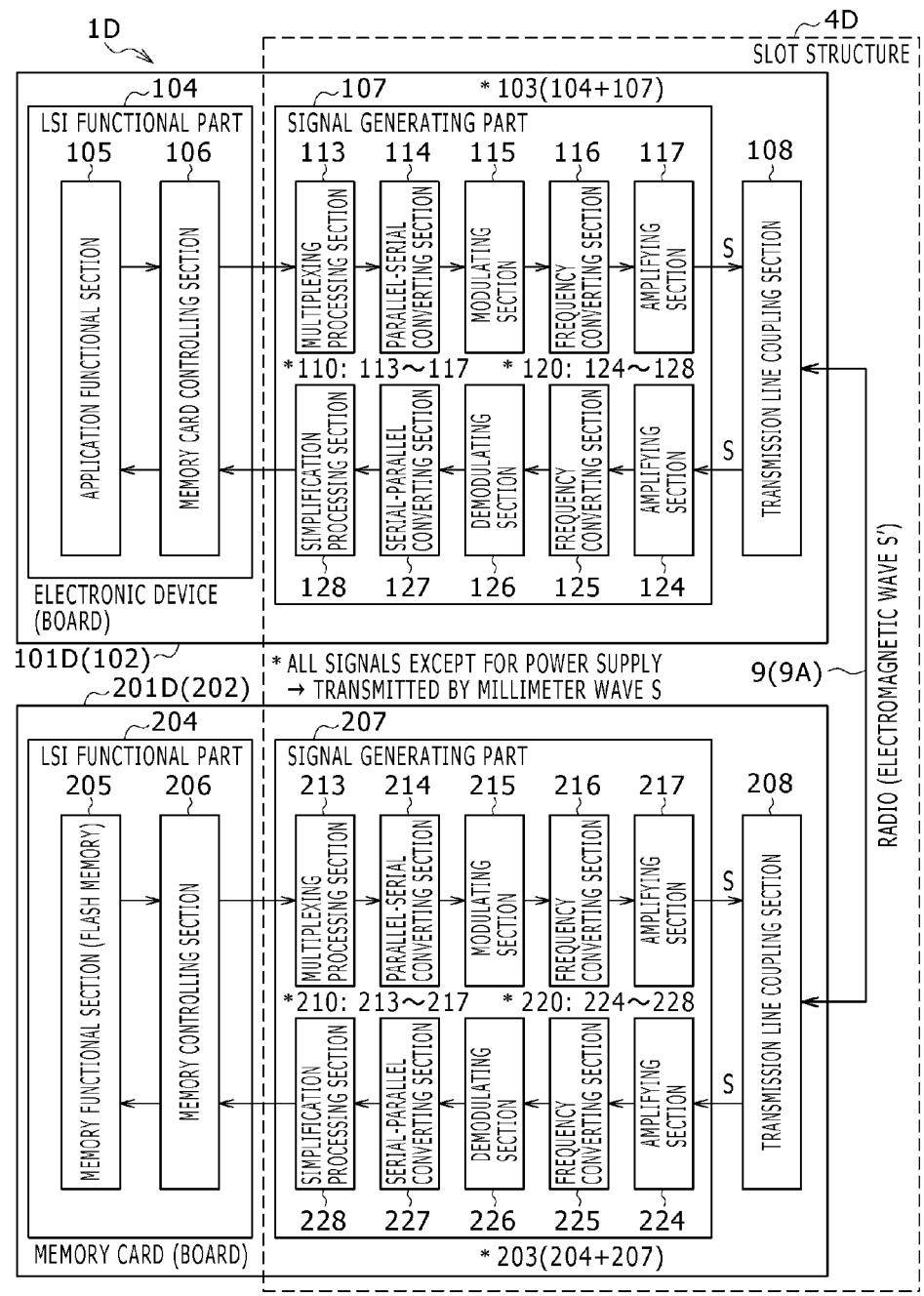
FIG. 7 is a diagram of assistance in explaining a signal interface in a radio transmission system according to a fourth embodiment from an aspect of functional configuration.

FIG. 7 is a diagram of assistance in explaining a signal interface in a radio transmission system according to a fourth embodiment. FIG. 7 is a diagram of assistance in explaining the signal interface in the radio transmission system 1D according to the fourth embodiment from an aspect of functional configuration.

The fourth embodiment sets not only signals desired to have a high-speed characteristic and a high-capacity characteristic but also other signals requiring only a low speed and a low capacity as signals as objects for communication in the millimeter wave band, and does not set only power as an object for conversion into a millimeter wave signal. For example, a command signal and a bus state signal (in the case of serial interface specifications) or an address signal and various other control signals (in the case of parallel interface specifications) correspond to the other signals requiring only a low speed and a low capacity.

According to the mechanism of the fourth embodiment, all signals excluding power are transmitted by the millimeter wave. While the fourth embodiment is shown as an example of modification of the first embodiment, the second and third embodiments can be modified similarly.

For the power not set as an object for conversion into a millimeter wave signal, electric wiring is drawn from LSI functional parts 104 and 204 to terminals, and an electric connection is established by mechanical contact via the terminals of both an electronic device 101A and a memory card 201A, as in the above-described comparative example.

In terms of functional configuration, only the signals set as objects for conversion into a millimeter wave signal are different from those of the first to third embodiments. Therefore description of other parts will be omitted.

Radio Transmission System

Fifth Embodiment

Figure 8:
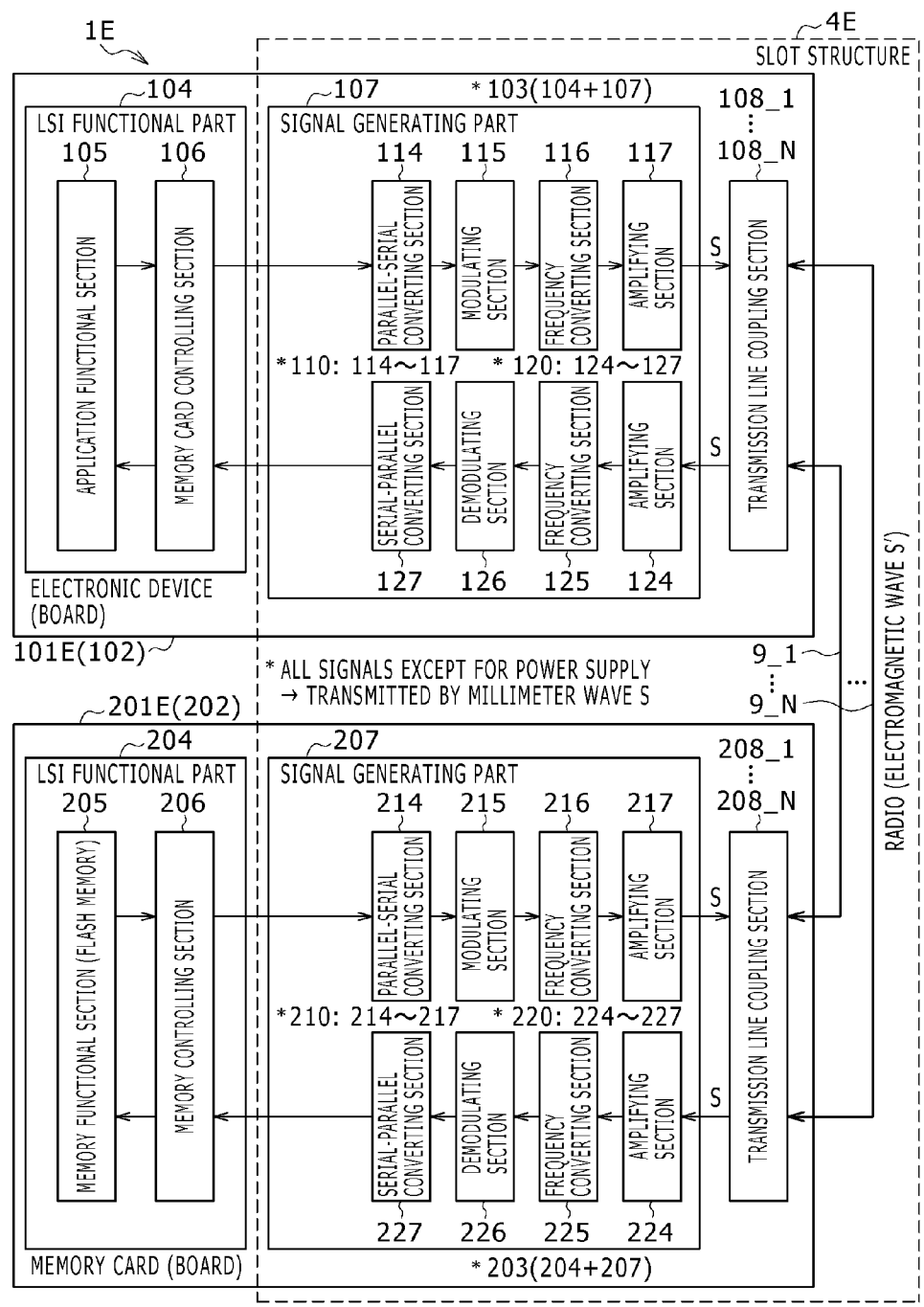
FIG. 8 is a diagram of assistance in explaining a signal interface in a radio transmission system according to a fifth embodiment from an aspect of functional configuration.

FIGS. 8 to 9C are diagrams of assistance in explaining a signal interface in a radio transmission system according to a fifth embodiment. FIG. 8 is a diagram of assistance in explaining the signal interface in the radio transmission system 1E according to the fifth embodiment from an aspect of functional configuration. FIGS. 9A to 9C are diagrams of assistance in explaining adequate conditions for "space division multiplexing."

The fifth embodiment is characterized by having millimeter wave signal transmission lines 9 of a plurality of systems by using pairs of transmission line coupling sections 108 and 208 as a plurality of sets. Suppose that the millimeter wave signal transmission lines 9 of the plurality of systems are installed so as not to interfere spatially with each other and are able to communicate at a same frequency at a same time. In the present embodiment, such a mechanism will be referred to as space division multiplexing. In realizing multiple transmission channels, when space division multiplexing is not applied, it is necessary to apply frequency division multiplexing and use different carrier frequencies for respective channels, but when space division multiplexing is applied, transmission can be performed without being affected by interference even at a same carrier frequency.

It suffices for "space division multiplexing" to be achieved by forming millimeter wave signal transmission lines 9 of a plurality of systems in a three-dimensional space capable of transmitting a millimeter wave signal (electromagnetic wave), and is not limited to formation of millimeter wave signal transmission lines 9 of a plurality of systems in a free space. For example, when the three-dimensional space capable of transmitting a millimeter wave signal (electromagnetic wave) is formed of a dielectric material (tangible object), millimeter wave signal transmission lines 9 of a plurality of systems may be formed in the dielectric material. In addition, each of the millimeter wave signal transmission lines 9 of the plurality of systems is not limited to being a free space, but may take the form of a dielectric transmission line, a hollow waveguide or the like.

Space division multiplexing allows a same frequency band to be used at a same time, and is thus able to increase communication speed and ensure the simultaneity of bidirectional communication in which signal transmission from an electronic device 101 to a memory card 201 and signal transmission from the memory card 201 to the electronic device 101 are performed simultaneously. In particular, millimeter waves have short wavelengths, an effect of attenuation of millimeter waves according to distance can be expected, interference does not occur easily even with a small offset (in a case of a short spatial distance between transmission channels), and propagation channels differing according to position are realized easily.

As shown in FIG. 8, the radio transmission system 1E according to the fifth embodiment has N systems of transmission line coupling sections 108 and 208 including a millimeter wave transmission terminal, a millimeter wave transmission line, an antenna and the like, and has N systems of millimeter wave signal transmission lines 9. Each of the transmission line coupling sections 108 and 208 and the millimeter wave signal transmission lines 9 is identified by a reference "_@" (@ is 1 to N). Thereby, a full-duplex transmission system in which millimeter wave transmissions corresponding to transmission and reception are performed independently of each other can be realized.

The multiplexing processing section 113 and the simplification processing section 128 are removed from the electronic device 101E, and the multiplexing processing section 213 and the simplification processing section 228 are removed from the memory card 201E. In this example, all signals are set as objects for transmission by the millimeter wave except for power supply.

The carrier frequencies of the respective systems may be identical or different from each other. For example, in a case of millimeter wave signal transmission lines 9A, millimeter waves are confined inside the millimeter wave signal transmission lines 9A, so that millimeter wave interference can be prevented, and no problem is presented at all even with the same frequency. In a case of free space transmission lines 9B, no problem is presented even with the same frequency when the free space transmission lines 9B are separated at certain intervals, but different frequencies are desirable when the free space transmission lines 9B are at short distances from each other.

For example, as shown in FIG. 9A, letting d be distance and letting λ be wavelength, the propagation loss L of a free space can be expressed as "L [dB]=$10 \log_{10}((4\pi d/\lambda)^2)$ . . . (A)."

Two kinds of communication of space division multiplexing as shown in FIGS. 9A to 9C will be considered. In FIGS. 9A to 9C, a transmitter is denoted by "TX," and a receiver is denoted by "RX." A reference "_101" indicates the electronic device 101 side, and a reference "_201" indicates the memory card 201 side. In FIG. 9B, the electronic device 101 has transmitters TX_101_1 and TX_101_2 of two systems, and the memory card 201 has receivers RX_201_1 and RX_201_2 of the two systems. That is, signal transmission from the electronic device 101 side to the memory card 201 side is performed between the transmitter TX_101_1 and the receiver RX_201_1 and between the transmitter TX_101_2 and the receiver RX_201_2. That is, signal transmission from the electronic device 101 side to the memory card 201 side is performed by two systems.

On the other hand, in FIG. 9C, the electronic device 101 has a transmitter TX_101 and a receiver RX_101, and the memory card 201 has a transmitter TX_201 and a receiver RX_201. That is, signal transmission from the electronic device 101 side to the memory card 201 side is performed between the transmitter TX_101 and the receiver RX_201, and signal transmission from the memory card 201 side to the electronic device 101 side is performed between the transmitter TX_201 and the receiver RX_101. This is a concept that separate communication channels are used for transmission and reception, and is a mode of a full-duplex communication where data transmission (TX) and reception (RX) can be performed simultaneously from both the electronic device 101 and the memory card 201.

In this case, a relation between a distance $d_1$ between antennas and a spatial channel interval (specifically a separation distance between free space transmission lines 9B) $d_2$ that are necessary to obtain a necessary DU [dB] (ratio between a desired wave and an undesired wave) using nondirectional antennas is "$d_2/d_1 = 10^{(DU/20)} \ldots$ (B)" from Equation (A).

When DU=20 dB, for example, $d_2/d_1=10$, and thus $d_2$ needs to be 10 times $d_1$. Because antennas generally have a certain directionality, $d_2$ can be set much shorter even in the case of free space transmission lines 9B.

For example, when an antenna is at a short distance from an antenna at the other end of communication, transmission power of each antenna can be lowered. When the transmission power is sufficiently low and the pair of antennas can be placed at sufficiently distant positions, interference between the pair of antennas can be reduced sufficiently. In millimeter wave communication, in particular, space division multiplexing is achieved easily because of short wavelengths of millimeter waves, great distance attenuation, and a little diffraction. For example, even with free space transmission lines 9B, the spatial channel interval (separation distance between the free space transmission lines 9B) $d_2$ can be set at for example about five to six times the distance $d_1$ between the antennas.

In the case of millimeter wave signal transmission lines 9 having a millimeter wave confining structure, millimeter wave signals can be transmitted in a state of being confined within the millimeter wave signal transmission lines 9, and thus the channels can be brought into proximity to each other with the spatial channel interval (separation distance between the free space transmission lines 9B) $d_2$ set at for example about two to three times the distance $d_1$ between the antennas.

For example, in order to realize bidirectional communication, a system of performing time division multiplexing as described in the first embodiment, frequency division multiplexing, code division multiplexing or the like can be considered in addition to space division multiplexing.

The first embodiment has the dielectric transmission line 9A of one system, and employs, as a system for realizing data transmission and reception, one of the half-duplex system that performs switching between transmission and reception by time division multiplexing and the full-duplex system that simultaneously performs transmission and reception by frequency division multiplexing or code division multiplexing.

However, time division multiplexing has a problem in that transmission and reception cannot be performed in parallel with each other. As shown in FIGS. 2A to 2C, frequency division multiplexing has a problem in that the bandwidth of the millimeter wave signal transmission line 9 needs to be widened.

On the other hand, the radio transmission system 1E according to the fifth embodiment allows the carrier frequencies of a plurality of signal transmission systems (plurality of channels) to be set at a same carrier frequency, and facilitates reuse of the carrier frequency (using the same frequency in the plurality of channels). Data transmission and reception can be realized simultaneously without the bandwidth of the millimeter wave signal transmission line 9 being widened.

In order to perform bidirectional transmission and reception when there are N systems of millimeter wave signal transmission lines 9 for N kinds of baseband signals, it suffices to apply time division multiplexing or frequency division multiplexing for the transmission and reception. In addition, when millimeter wave signal transmission lines 9 of 2N systems are used, transmission using millimeter wave signal transmission lines 9 of different systems even for the bidirectional transmission and reception (using transmission lines that are all independent of each other) can be performed. That is, when there are a plurality of kinds of signals as objects for communication in the millimeter wave band, these signals can be transmitted by respective separate millimeter wave signal transmission lines 9 without a multiplexing process such as time division multiplexing, frequency division multiplexing, and code division multiplexing being performed.

Radio Transmission System

Sixth Embodiment

FIG. 10 is a diagram of assistance in explaining a signal interface in a radio transmission system according to a sixth embodiment. Here, FIG. 10 is a diagram of assistance in explaining the signal interface in the radio transmission system 1F according to the sixth embodiment from an aspect of functional configuration. FIG. 10 shows an example of modification of the fourth embodiment.

The radio transmission system 1F according to the sixth embodiment is based on the fourth embodiment that transmits signals desired to have a high-speed characteristic and a high-capacity characteristic and other signals for which a low speed and a low capacity suffice, and also transmits power that needs power transmission by radio. That is, a mechanism for supplying power to be used by a memory card 201F from an electronic device 101F by radio is added.

The electronic device 101F includes a power supplying section 174 for supplying power to be used by the memory card 201F by radio. A mechanism of the power supplying section 174 will be described later.

The memory card 201F includes a power receiving section 278 for receiving power supply voltage (power supply power) transmitted from the electronic device 101F side by radio. A mechanism of the power receiving section 278 will be described later. In any system, the power receiving section 278 generates power supply voltage to be used on the memory card 201F side, and supplies the power supply voltage to a semiconductor chip 203 and the like.

In terms of functional configuration, the sixth embodiment is different from the fourth embodiment only in that power is also transmitted by radio. Therefore description of other parts will be omitted. One of an electromagnetic induction system, a radio wave reception system, and a resonance system, for example, is adopted as a mechanism for realizing power transmission by radio. This method completely eliminates a need for an interface via electric wiring and terminals, and makes it possible to form a cable-less system configuration. All signals including power can be transmitted by radio from the electronic device 101F to the memory card 201F. Incidentally, a coupling line for performing power transmission by radio may be constructed at a position other than the part of a slot structure 4.

For example, the electromagnetic induction system uses electromagnetic coupling of coils and induced electromotive force. Though not shown in the figure, the power supplying section 174 for supplying power by radio (a power transmitting side and a primary side) is provided with a primary coil, and the primary coil is driven at a relatively high frequency. The power receiving section 278 for receiving the power from the power supplying section 174 by radio (a power receiving side and a secondary side) is provided with a secondary coil at such a position as to be opposed to the primary coil, and is provided with a rectifier diode, capacitors for resonance and smoothing, and the like. For example, the rectifier diode and the smoothing capacitor form a rectifier circuit.

When the primary coil is driven at a high frequency, an induced electromotive force is generated in the secondary coil electromagnetically coupled to the primary coil. The rectifier circuit generates a direct-current voltage on the basis of the induced electromotive force. At this time, power reception efficiency is enhanced by using a resonance effect.

When the electromagnetic induction system is adopted, the power supplying section 174 and the power receiving section 278 are brought into proximity to each other, other members (metal in particular) are prevented from being interposed between the power supplying section 174 and the power receiving section 278 (specifically between the primary coil and the secondary coil), and electromagnetic shielding is provided for the coils. The former is to prevent heating of the metal (according to principles of electromagnetic induction heating), and the latter is to take a measure against electromagnetic interference with other electronic circuits. The electromagnetic induction system can transmit high power, but needs to bring the transmitter and the receiver into proximity to each other (for example a distance of 1 cm or less), as described above.

The radio wave reception system uses the energy of a radio wave, and converts an alternating-current waveform obtained by receiving a radio wave into a direct-current voltage by a rectifier circuit. The radio wave reception system has an advantage of being able to transmit power irrespective of the frequency band (for example millimeter waves may be used). Though not shown in the figure, the power supplying section 174 (transmitting side) for supplying power by radio is provided with a transmitting circuit for transmitting a radio wave in a certain frequency band. The power receiving section 278 (receiving side) for receiving the power from the power supplying section 174 by radio is provided with a rectifier circuit for rectifying the received radio wave. Though depending on transmission power, the received voltage is low, and a rectifier diode with as low a forward voltage as possible (for example a Schottky diode) is desirably used for the rectifier circuit. Incidentally, a resonant circuit may be formed in a stage preceding the rectifier circuit to increase the voltage and then perform rectification. In the radio wave reception system in ordinary outdoor use, much of the transmission power is spread as a radio wave, and thus power transmission efficiency is lowered. However, it is considered that this problem can be solved by combining a constitution capable of limiting a range of transmission (for example a millimeter wave signal transmission line of a confining structure).

The resonance system applies the same principles as those of a phenomenon in which two oscillators (pendulums or tuning forks) resonate, and uses a resonance phenomenon in a near field in one of an electric field and a magnetic field rather than an electromagnetic wave. The resonance system uses a phenomenon in which when one (corresponding to the power supplying section 174) of the two oscillators having a same natural frequency is oscillated, and only a small oscillation is transmitted to the other oscillator (corresponding to the power receiving section 278), the other oscillator starts vibrating greatly due to the resonance phenomenon.

In the case of a system using a resonance phenomenon in an electric field, a dielectric is disposed in both of the power supplying section 174 (power transmitting side) for supplying power by radio and the power receiving section 278 (power receiving side) for receiving the power from the power supplying section 174 by radio so that an electric field resonance phenomenon occurs between the power supplying section 174 and the power receiving section 278. It is important to use a dielectric having a dielectric constant of a few tens to over one hundred (much higher than an ordinary dielectric) and having as small a dielectric loss as possible as antennas, and excite a specific mode of oscillation in the antennas. For example, when a disk antenna is used, coupling is strongest when the oscillation mode around the disk is m=2 or 3.

In the case of a system using a resonance phenomenon in a magnetic field, an LC resonator is disposed in both of the power supplying section 174 (power transmitting side) for supplying power by radio and the power receiving section 278 (power receiving side) for receiving the power from the power supplying section 174 by radio so that a magnetic field resonance phenomenon occurs between the power supplying section 174 and the power receiving section 278. For example, a part of a loop type antenna is formed into the shape of a capacitor, which is combined with the inductance of the loop itself to form an LC resonator. The Q-value (strength of resonance) can be increased, and a rate at which power is absorbed by other than the antenna for resonance is low. Thus, the system using the resonance phenomenon in a magnetic field is similar to the electromagnetic induction system in that a magnetic field is used, but is a totally different system in that transmission of a few kW is possible in a state of the power supplying section 174 and the power receiving section 278 being more distant from each other than in the electromagnetic induction system.

In the case of the resonance system, regardless of whether the resonance phenomenon in an electric field is used or whether the resonance phenomenon in a magnetic field is used, wavelength $\lambda$ in an electromagnetic field, dimensions of a part forming an antenna (the radius of the disk of a dielectric in an electric field or the radius of a loop in a magnetic field), and a maximum distance for which power transmission is possible (distance D between antennas) are substantially proportional. In other words, it is important to maintain a ratio between the wavelength $\lambda$ of an electromagnetic wave of the same frequency as a frequency at which oscillation is effected, the distance D between the antennas, and the antenna radius r at a substantially constant value. In addition, because of the resonance phenomenon in a near field, it is important to make the wavelength $\lambda$ sufficiently greater than the distance D between the antennas, and make the antenna radius r not too much smaller than the distance D between the antennas.

The electric field resonance system has a shorter power transmission distance than a magnetic field and generates a small amount of heat, but causes a great loss due to an electromagnetic wave when there is an obstacle. The magnetic field resonance system is not affected by the capacitance of a dielectric such as a human, causes a small loss due to an electromagnetic wave, and has a long power transmission distance than an electric field. In the case of the electric field resonance system, interference (EMI) with signals used on a circuit board side needs to be considered when lower frequencies than the millimeter wave band are used, and when the millimeter wave band is used, interference with millimeter wave signal transmission in relation to signals needs to be considered. In the case of the magnetic field resonance system, there is basically a little outflow of energy due to an electromagnetic wave, and wavelength can be made different from those of the millimeter wave band, so that the problems of interference with the circuit board side and the millimeter wave signal transmission are solved.

The present embodiment can basically adopt any of the electromagnetic induction system, the radio wave reception system, and the resonance system. However, in consideration of the characteristics of each system as well as positional displacement, interference with existing circuits, efficiency and the like, it is desirable to adopt the resonance system using the magnetic field resonance phenomenon. For example, the power supply efficiency of the electromagnetic induction system is maximized when the central axis of the primary coil and the central axis of the secondary coil coincide with each other, and is decreased when there is an axial displacement. In other words, accuracy of alignment of the primary coil and the secondary coil greatly affects power transmission efficiency. When positional displacement is considered, the adoption of the electromagnetic induction system involves difficulties. The radio wave reception system and the electric field resonance system involve considering EMI (interference). In that respect, the magnetic field resonance system solves these problems.

Incidentally, reference may be made to the following Reference Documents 1 and 2, for example, for each of the electromagnetic induction system, the radio wave reception system, and the resonance system.

Reference Document 1: "Cover Story Feature Finally, Power Supply also Goes Wireless," the Mar. 26, 2007, issue of Nikkei Electronics, Nikkei BP, pp. 98-113

Reference Document 2: "Paper Wireless Technology Developed to Transmit Power Lights Up a 60 W Bulb in Tests," the Dec. 3, 2007, issue of Nikkei Electronics, Nikkei BP, pp. 117-128

Radio Transmission System

Seventh Embodiment

Figure 11:
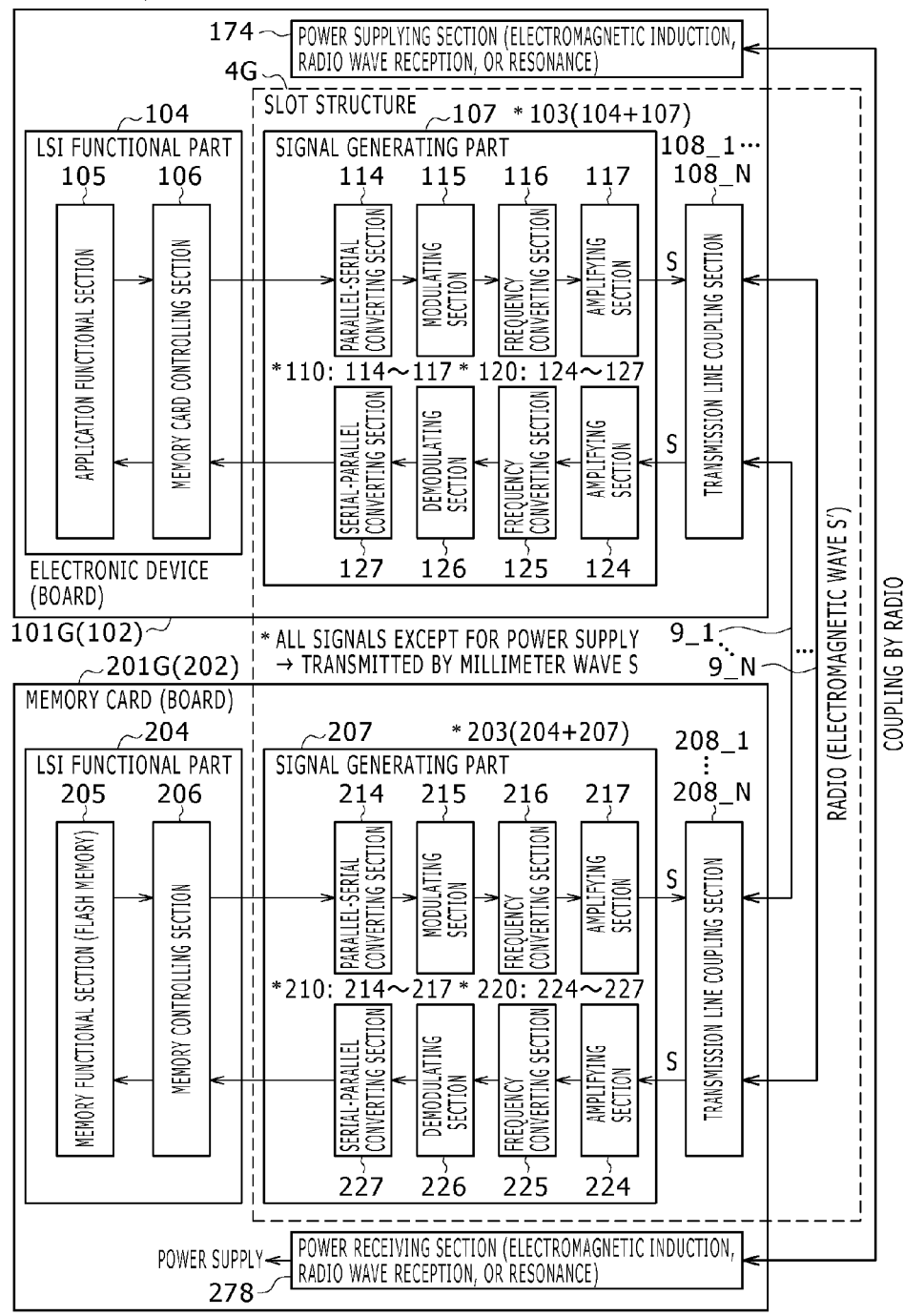
FIG. 11 is a diagram of assistance in explaining a signal interface in a radio transmission system according to a seventh embodiment from an aspect of functional configuration.

FIG. 11 is a diagram of assistance in explaining a signal interface in a radio transmission system according to a seventh embodiment. FIG. 11 is a diagram of assistance in explaining the signal interface in the radio transmission system 1G according to the seventh embodiment from an aspect of functional configuration. FIG. 11 shows an example of modification of the fifth embodiment.

The seventh embodiment is based on the mechanism of the fifth embodiment, and is further characterized in that power that needs power transmission is also transmitted by radio. That is, a mechanism for supplying power to be used by a memory card 201G from an electronic device 101G by radio is added.

The mechanism for the power supply, that is, for transmitting the power by radio employs one of the electromagnetic induction system, the radio wave reception system, and the resonance system as described in the sixth embodiment. Also in this case, as in the sixth embodiment, a constitution employing the magnetic field resonance system is shown.

The electronic device 101G includes a power supplying section 174 for supplying power to be used in the memory card 201G by radio. The power supplying section 174 has an LC resonator to employ the magnetic field resonance system.

The memory card 201G includes a power receiving section 278 for receiving the power transmitted from the electronic device 101G side by radio. The power receiving section 278 has an LC resonator to employ the magnetic field resonance system.

In terms of functional configuration, the seventh embodiment is different from the fifth embodiment only in that the seventh embodiment has a system for power transmission and a system for signal transmission. Therefore description of other parts will be omitted. This method completely eliminates a need for an interface via electric wiring and terminals, and makes it possible to form a cable-less system configuration. Problems of life and replacement when the memory card 201G has a battery are solved.

Millimeter Wave Transmission Structure

First Example

FIGS. 12A to 12C are diagrams of assistance in explaining a first example of a millimeter wave transmission structure of a memory card 201 and an electronic device 101 having a slot structure 4 (hereinafter described as a "present embodiment"). The first example is an example of application of a millimeter wave transmission structure for realizing the functional configuration of the radio transmission system 1A according to the first embodiment.

The slot structure 4A between the electronic device 101A and the memory card 201A is a structure for inserting and removing the memory card 201A into and from the electronic device 101A. The slot structure 4A has a function of means for fixing the electronic device 101A and the memory card 201A.

As shown in FIG. 12B, the slot structure 4A is formed such that the memory card 201A (a casing 290 of the memory card 201A) can be inserted into and removed from a casing 190 on the side of the electronic device 101A from an opening part 192 and fixed to the casing 190. A board 102 is attached to one surface of the casing 190 on an opposite side (outside) from the opening part 192 by a supporting member 191.

A receiving side connector is disposed at a position of contact of the slot structure 4A with the terminal of the memory card 201A. No connector terminal (connector pin) is necessary for signals replaced by millimeter wave transmission.

Incidentally, a connector terminal may be provided also for the signals replaced by millimeter wave transmission on the side of the electronic device 101A (slot structure 4A). In this case, when a related-art memory card 201 to which the millimeter wave transmission structure according to the first example is not applied is inserted into the slot structure 4A, signal transmission can be performed by electric wiring as in a related-art case.

The electronic device 101A and the memory card 201A have depression and projection shape configurations as a fitting structure. In this case, as shown in FIG. 12B, the casing 190 of the electronic device 101A has a cylindrical projection shape configuration 198A (protrusion), and as shown in FIG. 12A, the casing 290 of the memory card 201A has a cylindrical depression shape configuration 298A (hollow). That is, as shown in FIG. 12C, the projection shape configuration 198A is disposed in a part corresponding to the position of the depression shape configuration 298A when the memory card 201A is inserted in the casing 190.

By such a configuration, the memory card 201A is fixed and aligned simultaneously when the memory card 201A is mounted in the slot structure 4A. Incidentally, even when the projection and depression shapes are not fitted to each other steadily, it suffices for the projection and depression shapes to be set at a size such that antennas 136 and 236 do not fall outside a shielding member (enclosure: conductor 144). It is not essential that the planar shape of the projection and depression shape configurations be a circular shape as in the figure, but the planar shape of the projection and depression shape configurations is an arbitrary shape such as a triangle and a square.

For instance, an example of structure (plane perspective and sectional perspective) of the memory card 201A is shown in FIG. 12A. The memory card 201A has a semiconductor chip 203 including a signal generating part 207 (millimeter wave signal converting section) on one surface of a board 202. The semiconductor chip 203 is provided with a millimeter wave transmitting and receiving terminal 232 for coupling to a millimeter wave signal transmission line 9 (dielectric transmission line 9A). A millimeter wave transmission line 234 made of a board pattern connected to the millimeter wave transmitting and receiving terminal 232 and an antenna 236 (patch antenna in FIGS. 12A to 12C) are formed on one surface of the board 202. The millimeter wave transmitting and receiving terminal 232, the millimeter wave transmission line 234, and the antenna 236 form a transmission line coupling section 208.

The patch antenna does not have a sharp directionality in a normal direction. Thus, when overlapping parts of the antennas 136 and 236 have a large area, displacement to a certain degree of the antennas 136 and 236 from each other does not affect reception sensitivity. In millimeter wave communication, millimeter waves have short wavelengths of a few mm, and thus the antennas have a small size on the order of a few mm square and can be easily mounted in a small space such as the inside of the small memory card 201. Letting λg be wavelength in the board, the length of one side of the patch antenna is expressed as λg/2. For example, when a millimeter wave signal of 60 GHz is used in the boards 102 and 202 having a relative dielectric constant of 3.5, λg is about 2.7 mm, and one side of the patch antenna is about 1.4 mm.

Incidentally, even smaller antennas such as an inverted-F type, for example, are desired when the antennas 136 and 236 are formed within the semiconductor chips 103 and 203. Incidentally, the inverted-F antenna is nondirectional. In other words, the inverted-F antenna has directionality in not only a direction of board thickness (normal) but also a planar direction. Therefore transmission efficiency is desirably improved by adopting a device such as providing a reflector to the transmission line coupling sections 108 and 208 for coupling to the millimeter wave signal transmission line 9 (dielectric transmission line 9A).

The casing 290 is a cover for protecting the board 202. At least the part of the depression shape configuration 298A is formed by a dielectric resin including a dielectric material having a relative dielectric constant enabling millimeter wave signal transmission. For example, a member formed of an acrylic resin base, a urethane resin base, an epoxy resin base or the like is used as the dielectric material of the depression shape configuration 298A. The dielectric material of the part of at least the depression shape configuration 298A in the casing 290 also forms a millimeter wave dielectric transmission line.

The depression shape configuration 298A is formed in the same plane as the antenna 236 in the casing 290. The depression shape configuration 298A fixes the memory card 201A to the slot structure 4A, and performs alignment for coupling of millimeter wave transmission to the dielectric transmission line 9A of the slot structure 4A.

A connecting terminal 280 (signal pin) for being connected to the electronic device 101A at a determined position of the casing 290 is disposed at the determined position of the casing 290 at one side of the board 202. In the case of the first embodiment, the memory card 201A includes, in a part thereof, a related-art terminal structure for low-speed and low-capacity signals and for power supply. A clock signal and a plurality of data signals are objects for signal transmission by the millimeter wave, and thus terminals therefor are removed, as indicated by dotted lines in FIGS. 12A to 12C.

An example of structure (plane perspective and sectional perspective) of the electronic device 101A is shown in FIG. 12B. The electronic device 101A has a semiconductor chip 103 including a signal generating part 107 (millimeter wave signal converting section) on one surface (opening part 192 side) of the board 102. The semiconductor chip 103 is provided with a millimeter wave transmitting and receiving terminal 132 for coupling to the millimeter wave signal transmission line 9 (dielectric transmission line 9A). A millimeter wave transmission line 134 made of a board pattern connected to the millimeter wave transmitting and receiving terminal 132 and an antenna 136 (patch antenna in FIGS. 12A to 12C) are formed on one surface of the board 102. The millimeter wave transmitting and receiving terminal 132, the millimeter wave transmission line 134, and the antenna 136 form a transmission line coupling section 108.

The opening part 192 into and from which the memory card 201A is inserted and removed is formed as the slot structure 4A in the casing 190.

The casing 190 has the projection shape configuration 198A formed so as to constitute the dielectric transmission line 9A in the part corresponding to the position of the depression shape configuration 298A when the memory card 201A is inserted into the opening part 192. In the present example, the projection shape configuration 198A (dielectric transmission line 9A) is configured by forming a dielectric waveguide 142 within a tubular conductor 144, and is fixedly disposed such that the center of the dielectric waveguide 142 coincides with the antenna 136 of the transmission line coupling section 108. The dielectric waveguide 142 is provided as a structure for strengthening coupling between the antennas 136 and 236 in the projection and depression fitting structure. Incidentally, it is not essential that the dielectric waveguide 142 (dielectric transmission line 9A) be provided. The millimeter wave signal transmission line 9 may be formed by the dielectric material of the casings 190 and 290 as it is.

Parameters such as the diameter, length, and material of the dielectric waveguide 142 are determined so as to be able to transmit millimeter wave signals efficiently. It is desirable to use, as the material of the dielectric waveguide 142, a dielectric material having a relative dielectric constant of about 2 to 10 (preferably 3 to 6) and a dielectric loss tangent of about 0.00001 to 0.01 (preferably 0.00001 to 0.001) such as a dielectric material formed of an acrylic resin base, a urethane resin base, an epoxy resin base, a silicone base, a polyimide base, or a cyanoacrylate resin base, as described above. By confining a millimeter wave signal in the dielectric transmission line 9A, transmission efficiency can be improved, and millimeter wave signal transmission can be performed without any inconvenience. The conductor 144 does not need to be provided in some cases by properly selecting the material.

The diameter of the conductor 144 is made to correspond to the diameter of the depression shape configuration 298A of the memory card 201A. The conductor 144 also has an effect of a shielding material for suppressing external radiation of a millimeter wave transmitted within the dielectric waveguide 142.

FIG. 12C shows an example of a structure (sectional perspective) when the memory card 201A is inserted into the slot structure 4A (opening part 192 in particular) of the electronic device 101A. As shown in FIGS. 12A to 12C, the casing 190 of the slot structure 4A has a mechanical structure such that the projection shape configuration 198A (dielectric transmission line 9A) and the depression shape configuration 298A come into contact with each other in the form of a projection and a depression when the memory card 201A is inserted from the opening part 192 into the casing 190 of the slot structure 4A. When the projection and depression structures are fitted to each other, the antennas 136 and 236 are opposed to each other, and the dielectric transmission line 9A is disposed as the millimeter wave signal transmission line 9 between the antennas 136 and 236.

The memory card 201A and the slot structure 4A are fixed to each other by the above constitution. In addition, the alignment of the dielectric transmission line 9A for coupling of millimeter wave transmission is achieved so as to transmit millimeter wave signals efficiently between the antennas 136 and 236.

That is, the transmission line coupling section 108 (antenna coupling section in particular) is disposed in the part of the projection shape configuration 198A in the electronic device 101A, and the transmission line coupling section 208 (antenna coupling section in particular) is disposed in the part of the depression shape configuration 298A in the memory card 201A. The transmission line coupling section 108 and the transmission line coupling section 208 are arranged such that the millimeter wave transmission characteristics of the transmission line coupling sections 108 and 208 are enhanced when the projection and the depression are matched.

With such a constitution, the fixing of the memory card 201A and alignment for millimeter wave signal transmission can be performed simultaneously when the memory card 201A is mounted in the slot structure 4A. Although the casing 290 is interposed between the dielectric transmission line 9A and the antenna 236 at the memory card 201A, the material of the part of the depression shape configuration 298A is a dielectric material, and thus does not produce a great effect on millimeter wave transmission. The same is true for a case where the dielectric waveguide 142 is not provided in the part of the projection shape configuration 198A but the dielectric material of the casing 190 is used as it is. The dielectric materials of the respective casings 190 and 290 form the millimeter wave signal transmission line 9 (dielectric transmission line 9A) between the antennas 136 and 236.

Thus, according to the millimeter wave transmission structure according to the first example, a constitution is adopted in which the dielectric transmission line 9A having the dielectric waveguide 142 is interposed between the transmission line coupling sections 108 and 208 (antennas 136 and 236 in particular) when the memory card 201A is mounted in the slot structure 4A. The efficiency of high-speed signal transmission can be improved by confining millimeter wave signals in the dielectric transmission line 9A.

As an idea, it is possible to form the millimeter wave signal transmission line 9 (dielectric transmission line 9A) such that the antenna 136 and the antenna 236 are opposed to each other in a position other than the part of the fitting structure (the projection shape configuration 198 and the depression shape configuration 298) of the slot structure 4A for mounting the card. However, there is an effect of positional displacement in this case. On the other hand, the effect of positional displacement can be surely eliminated by providing the millimeter wave signal transmission line 9 in the fitting structure of the slot structure 4A for mounting the card.

Millimeter Wave Transmission Structure

Second Example

FIGS. 13A to 13C are diagrams of assistance in explaining a second example of the millimeter wave transmission structure according to the present embodiment. The second example is an example of application of a millimeter wave transmission structure for realizing the functional configuration of the radio transmission system 1B according to the second embodiment.

In the radio transmission system 1B according to the second embodiment, the millimeter wave signal transmission line 9 is the free space transmission line 9B, and thus the millimeter wave transmission structure has provisions corresponding to the free space transmission line 9B. Specifically, as shown in FIG. 13A, the memory card 201B is similar to the millimeter wave transmission structure according to the first example.

On the other hand, in the electronic device 101B, as shown in FIG. 13B, the projection shape configuration 198A is modified into a projection shape configuration 198B forming a part of the casing 190. It suffices to form the projection shape configuration 198B (free space transmission line 9B) by providing a cylindrical protrusion at a position of the casing 190 which position corresponds to a depression shape configuration 298B. It is desirable that the thickness of the part of the projection shape configuration 198B which part corresponds to the depression shape configuration 298B be about the same as the thickness of other parts of the casing 190. When a conductor 144 is provided on the periphery of the protrusion part, a structure similar to a hollow waveguide according to a seventh example to be described later is obtained. In either case, the projection shape configuration 198B is disposed such that the center of the inside diameter of the cylindrical protrusion coincides with the antenna 136 of the transmission line coupling section 108. The millimeter wave transmission structure according to the second example is otherwise the same as the millimeter wave transmission structure according to the first example.

At least the part of the projection shape configuration 198B of the casing 190 is formed by a dielectric resin including a dielectric material having a relative dielectric constant enabling millimeter wave signal transmission. For example, a member formed of an acrylic resin base, a urethane resin base, an epoxy resin base or the like is used as the dielectric material of the projection shape configuration 198B. The dielectric material of the part of at least the projection shape configuration 198B in the casing 190 also forms a millimeter wave dielectric transmission line. The projection shape configuration 198B and the depression shape configuration 298B form the free space transmission line 9B for millimeter wave signals.

With such a constitution, the fixing of the memory card 201B and alignment for millimeter wave signal transmission can be performed simultaneously when the memory card 201B is mounted in a slot structure 4B. Although the casings 190 and 290 are interposed between the antennas 136 and 236, the materials of the parts of the projection shape configuration 198B and the depression shape configuration 298B are both a dielectric, and thus do not produce a great effect on millimeter wave transmission. When the thickness of the part of the projection shape configuration 198B which part corresponds to the depression shape configuration 298B is about the same as the thickness of other parts of the casing 190, as indicated by a dotted line in FIGS. 13A to 13C, the effect can be reduced more surely.

Millimeter Wave Transmission Structure

Third Example

Figure 14A:
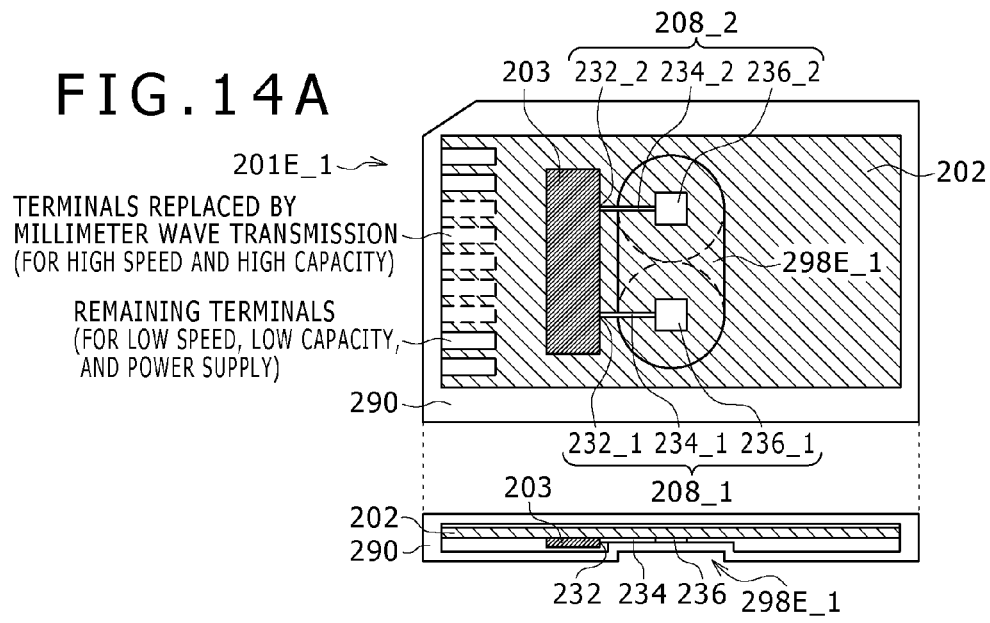
FIGS. 14A to 14C are diagrams of assistance in explaining a third example of the millimeter wave transmission structure according to the present embodiment.
Figure 14B:
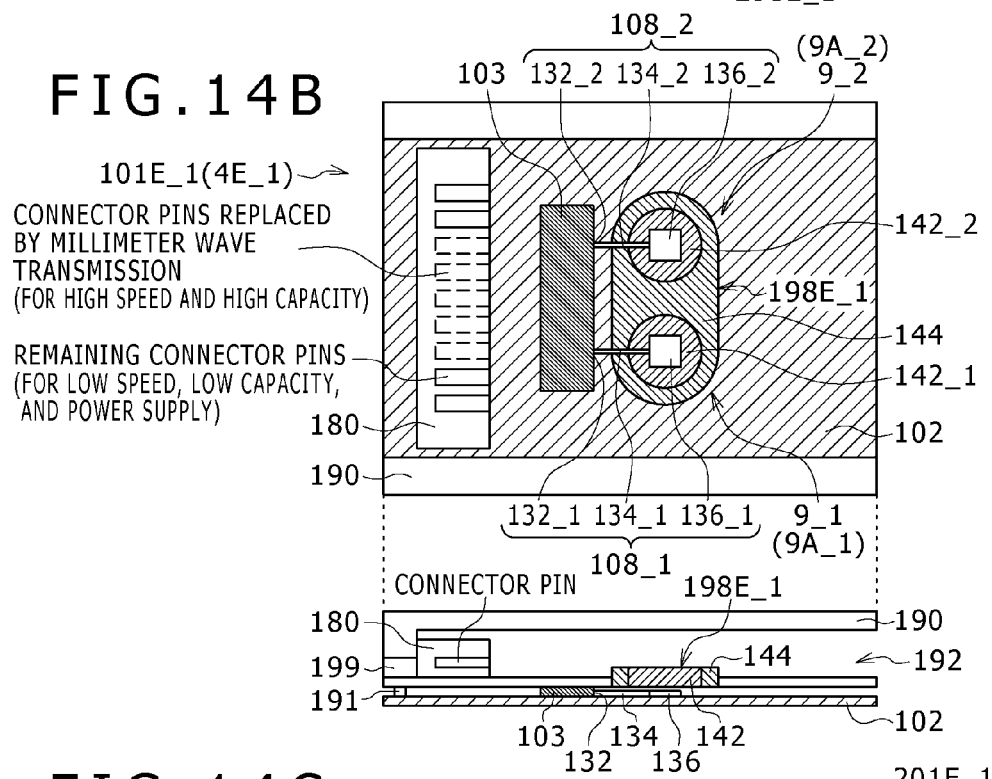
Figure 14C:
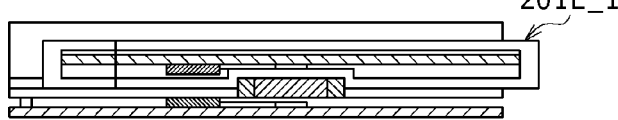

FIGS. 14A to 14C are diagrams of assistance in explaining a third example of the millimeter wave transmission structure according to the present embodiment. The third example is an example of application of a millimeter wave transmission structure for realizing the functional configuration of the radio transmission system 1E according to the fifth embodiment.

In the radio transmission system 1E according to the fifth embodiment, millimeter wave signal transmission lines 9 of a plurality of systems are provided by using a plurality of sets of transmission line coupling sections 108 and 208. Thus, the millimeter wave transmission structure also has provisions corresponding to the millimeter wave signal transmission lines 9 of the plurality of systems. A slot structure 4E_1 and a memory card 201E_1 have a plurality of systems of millimeter wave signal transmission lines 9 (dielectric transmission lines 9A), millimeter wave transmitting and receiving terminals 232, millimeter wave transmission lines 234, and antennas 136 and 236. In the slot structure 4E_1 and the memory card 201E_1, the antennas 136 and 236 are disposed on a same board surface and arranged horizontally. Thereby, a full-duplex transmission system in which millimeter wave transmissions corresponding to transmission and reception are performed independently of each other is realized.

For instance, an example of structure (plane perspective and sectional perspective) of an electronic device 101E_1 is shown in FIG. 14B. Millimeter wave transmitting and receiving terminals 132_1 and 132_2 for coupling to millimeter wave signal transmission lines 9_1 and 9_2 (dielectric transmission lines 9A_1 and 9A_2) are provided to a semiconductor chip 103 at separated positions. Millimeter wave transmission lines 134_1 and 134_2 connected to the millimeter wave transmitting and receiving terminals 132_1 and 132_2 and antennas 136_1 and 136_2 are formed on one surface of a board 102. The millimeter wave transmitting and receiving terminal 132_1, the millimeter wave transmission line 134_1, and the antenna 136_1 form a transmission line coupling section 108_1. The millimeter wave transmitting and receiving terminal 132_2, the millimeter wave transmission line 134_2, and the antenna 136_2 form a transmission line coupling section 108_2.

In addition, cylindrical dielectric waveguides 142_1 and 142_2 of two systems are arranged in parallel with each other as a projection shape configuration 198E_1 in a casing 190 so as to correspond to the arrangement of the antennas 136_1 and 136_2. The dielectric waveguides 142_1 and 142_2 of the two systems are formed in a cylindrical shape within an integral conductor 144 and constitute dielectric transmission lines 9A_1 and 9A_2. The conductor 144 prevents millimeter wave interference between the dielectric transmission lines 9A_1 and 9A_2 of the two systems.

An example of structure (plane perspective and sectional perspective) of the memory card 201E_1 is shown in FIG. 14A. Millimeter wave transmitting and receiving terminals 232_1 and 232_2 for coupling to the millimeter wave signal transmission lines 9_1 and 9_2 (dielectric transmission lines 9A_1 and 9A_2) of a plurality of systems (two systems in FIGS. 14A to 14C) are provided to a semiconductor chip 203 on a board 202 at separated positions. Millimeter wave transmission lines 234_1 and 234_2 connected to the millimeter wave transmitting and receiving terminals 232_1 and 232_2 and antennas 236_1 and 236_2 are formed on one surface of the board 202. The millimeter wave transmitting and receiving terminal 232_1, the millimeter wave transmission line 234_1, and the antenna 236_1 form a transmission line coupling section 208_1. The millimeter wave transmitting and receiving terminal 232_2, the millimeter wave transmission line 234_2, and the antenna 236_2 form a transmission line coupling section 208_2.

A depression shape configuration 298E_1 corresponding to the sectional shape of the projection shape configuration 198E_1 (conductor 144) on the electronic device 101E_1 side is formed in the casing 290 of the memory card 201E_1. As in the millimeter wave transmission structure according to the first example, the depression shape configuration 298E_1 fixes the memory card 201E_1 to the slot structure 4E_1, and performs alignment for coupling of millimeter wave transmission to the dielectric transmission lines 9A_1 and 9A_2 of the slot structure 4E_1.

In this case, the millimeter wave signal transmission lines 9_1 and 9_2 are both a dielectric transmission line 9A. However, for example, one of the millimeter wave signal transmission lines 9_1 and 9_2 may be a free space transmission line or a hollow waveguide, or may both be a free space transmission line or a hollow waveguide.

According to the millimeter wave transmission structure according to the third example, the radio transmission system 1E according to the fifth embodiment can be realized. Thus, because space division multiplexing makes it possible to use a same frequency band at a same time, communication speed can be increased, and the simultaneity of bidirectional communication in which signal transmissions are performed simultaneously can be ensured. By forming the millimeter wave signal transmission lines 9_1 and 9_2 (dielectric transmission lines 9A_1 and 9A_2) of the plurality of systems, full-duplex transmission is made possible, and efficiency of data transmission and reception can be improved.

Millimeter Wave Transmission Structure

Fourth Example

FIGS. 15A to 15C are diagrams of assistance in explaining a fourth example of the millimeter wave transmission structure according to the present embodiment. As with the third example, the fourth example is an example of application of a millimeter wave transmission structure for realizing the functional configuration of the radio transmission system 1E according to the fifth embodiment.

The fourth example is different from the third example in that millimeter wave signal transmission lines of a plurality of systems are disposed on different board surfaces. Specifically, antennas 236 are arranged on respective surfaces of a board 202 so as to be opposed to each other in a memory card 201E_2, and in correspondence with this, a slot structure 4E_2 has antennas 136 arranged separately on respective separate boards 102 provided to inner surfaces on both sides of an opening part 192. Also in the fourth example, a full-duplex transmission system in which millimeter wave transmissions corresponding to transmission and reception are performed independently of each other is realized.

For instance, an example of structure (plane perspective and sectional perspective) of the memory card 201E_2 is shown in FIG. 15A. Millimeter wave transmitting and receiving terminals 232_1 and 232_2 for coupling to millimeter wave signal transmission lines 9_1 and 9_2 (dielectric transmission lines 9A_1 and 9A_2) are provided to a semiconductor chip 203 so as to be substantially opposed to each other on both surfaces of the board 202. Though it is difficult to understand from the plane perspective, as is understood from the sectional perspective, the semiconductor chip 203 and the millimeter wave transmitting and receiving terminal 232_2 are connected to each other by a through hole pattern 231.

A millimeter wave transmission line 234_1 connected to the millimeter wave transmitting and receiving terminal 232_1 and an antenna 236_1 are formed on one surface (side on which the semiconductor chip 203 is disposed) of the board 202. A millimeter wave transmission line 234_2 connected to the millimeter wave transmitting and receiving terminal 232_2 and an antenna 236_2 are formed on the other surface of the board 202. Though it is difficult to understand from the plane perspective, as is understood from the sectional perspective, the millimeter wave transmission lines 234_1 and 234_2 and the antennas 236_1 and 236_2 are respectively arranged at substantially opposed positions on both sides of the board 202.

When the board 202 is made of a glass epoxy resin, for example, the board is also a dielectric and has a property of transmitting millimeter waves, and interference between the two sides of the board is expected to occur. In such a case, millimeter wave interference between the two sides of the board is desirably prevented by disposing a grounding layer, for example, as an inner layer of the board 202 which layer corresponds to the millimeter wave transmission lines 234_1 and 234_2 and the antennas 236_1 and 236_2. That is, a structure for enhancing isolation between antenna elements is provided to the fitting structure.

The millimeter wave transmitting and receiving terminal 232_1, the millimeter wave transmission line 234_1, and the antenna 236_1 form a transmission line coupling section 208_1. The millimeter wave transmitting and receiving terminal 232_2, the millimeter wave transmission line 234_2, and the antenna 236_2 form a transmission line coupling section 208_2.

A depression shape configuration 298E_2a is formed at a position on a surface side corresponding to an antenna 136_1 in a casing 290. A depression shape configuration 298E_2b is formed at a position on a surface side corresponding to an antenna 136_2 in the casing 290. That is, the depression shape configurations 298E_2a and 298E_2b are formed at the positions corresponding to the antennas 236_1 and 236_2 on both sides in the casing 290.

An example of structure (plane perspective and sectional perspective) of an electronic device 101E_2 is shown in FIG. 15B. In the fourth example, boards 102_1 and 102_2 are attached by a supporting member 191 to surfaces on both sides as opposite sides (outside) from the opening part 192 of a casing 190 so as to receive millimeter wave signals emitted separately from both sides of the memory card 201E_2.

A semiconductor chip 103_1 is provided on one surface (opening part 192 side) of the board 102_1. A millimeter wave transmitting and receiving terminal 132_1 for coupling to the dielectric transmission line 9A_1 is provided to the semiconductor chip 103_1. A millimeter wave transmission line 134_1 connected to the millimeter wave transmitting and receiving terminal 132_1 and an antenna 136_1 are formed on one surface of the board 102_1. The millimeter wave transmitting and receiving terminal 132_1, the millimeter wave transmission line 134_1, and the antenna 136_1 form a transmission line coupling section 108_1.

A semiconductor chip 103_2 is provided on one surface (opening part 192 side) of the board 102_2. A millimeter wave transmitting and receiving terminal 132_2 for coupling to the dielectric transmission line 9A_2 is provided to the semiconductor chip 103_2. A millimeter wave transmission line 134_2 connected to the millimeter wave transmitting and receiving terminal 132_2 and an antenna 136_2 are formed on one surface of the board 102_2. The millimeter wave transmitting and receiving terminal 132_2, the millimeter wave transmission line 134_2, and the antenna 136_2 form a transmission line coupling section 108_2.

In addition, in the casing 190, a projection shape configuration 198E_2a is formed so as to constitute a dielectric transmission line 9A_1 at a part corresponding to the arrangement position of the antenna 136_1, and a projection shape configuration 198E_2b is formed so as to constitute a dielectric transmission line 9A_2 at a part corresponding to the arrangement position of the antenna 136_2. The projection shape configurations 198E_2a and 198E_2b (dielectric transmission lines 9A_1 and 9A_2) are respectively configured by forming dielectric waveguides 142_1 and 142_2 within tubular conductors 144_1 and 144_2. The projection shape configurations 198E_2a and 198E_2b (dielectric transmission lines 9A_1 and 9A_2) are disposed fixedly such that the center of the dielectric waveguides 142_1 and 142_2 coincides with the antennas 136_1 and 136_2 of the transmission line coupling sections 108_1 and 108_2.

The depression shape configuration 298E_2a of the memory card 201E_2 is formed so as to correspond to the sectional shape of the projection shape configuration 198E_2a (conductor 144_1) on the electronic device 101E_2 side. The depression shape configuration 298E_2a fixes the memory card 201E_2 to the slot structure 4E_2, and performs alignment for coupling of millimeter wave transmission to the dielectric transmission line 9A_1 of the slot structure 4E_2.

The depression shape configuration 298E_2b of the memory card 201E_2 is formed so as to correspond to the sectional shape of the projection shape configuration 198E_2b (conductor 144_2) on the electronic device 101E_2 side. The depression shape configuration 298E_2b fixes the memory card 201E_2 to the slot structure 4E_2, and performs alignment for coupling of millimeter wave transmission to the dielectric transmission line 9A_2 of the slot structure 4E_2.

In this case, the millimeter wave signal transmission lines 9_1 and 9_2 are both a dielectric transmission line 9A. However, for example, one of the millimeter wave signal transmission lines 9_1 and 9_2 may be a free space transmission line or a hollow waveguide, or may both be a free space transmission line or a hollow waveguide.

Also with the millimeter wave transmission structure according to the fourth example, the radio transmission system 1E according to the fifth embodiment can be realized. Thus, because space division multiplexing makes it possible to use a same frequency band at a same time, communication speed can be increased, and the simultaneity of bidirectional communication in which signal transmissions are performed simultaneously can be ensured. By forming the dielectric transmission lines 9A of the plurality of systems, full-duplex transmission is made possible, and efficiency of data transmission and reception can be improved. The fourth example is an effective method when a space for arranging a plurality of antennas cannot be secured on a same surface of a board because of layout limitations.

Millimeter Wave Transmission Structure

Fifth Example

FIGS. 16A to 16C are diagrams of assistance in explaining a fifth example of the millimeter wave transmission structure according to the present embodiment. In the fifth example, an antenna 136 on the side of an electronic device 101J and an antenna 236 on the side of a memory card 201J are disposed so as to be greatly displaced from each other in planar terms to such a degree that the two antennas do not have overlapping parts at all in a state of the memory card 201J being housed in the electronic device 101J. In the following, the fifth example will be shown as an example of modification of the first example. However, the fifth example can be similarly applied to the second to fourth examples.

Description will be made of for example a case where the antenna 236 on the side of the memory card 201J is disposed in the position of a depression shape configuration 298J but the antenna 136 on the side of the electronic device 101J is not disposed in the position of a projection shape configuration 198J. An example of structure (plane perspective and sectional perspective) of the memory card 201J is shown in FIG. 16A, which is exactly the same as in the first example.

An example of structure (plane perspective and sectional perspective) of the electronic device 101J is shown in FIG. 16B, in which a millimeter wave signal transmission line 9 is different from that of the first example. In the electronic device 101J, a millimeter wave transmitting and receiving terminal 132 for coupling to the millimeter wave signal transmission line 9 (dielectric transmission line 9J) is provided to a semiconductor chip 103 provided on one surface of a board 102. A millimeter wave transmission line 134 connected to the millimeter wave transmitting and receiving terminal 132 and the antenna 136 are formed on the one surface (opening part 192 side) of the board 102. The millimeter wave transmitting and receiving terminal 132, the millimeter wave transmission line 134, and the antenna 136 form a transmission line coupling section 108.

A casing 190 has the projection shape configuration 198J formed so as to constitute a part of the dielectric transmission line 9J in a part corresponding to the depression shape configuration 298J when the memory card 201J is inserted in the opening part 192.

An example of a structure (sectional perspective) when the memory card 201J is inserted in the slot structure 4J (opening part 192 in particular) of the electronic device 101J is shown in FIG. 16C. As shown in the figure, the casing 190 of the slot structure 4J has a mechanical structure such that the projection shape configuration 198J and the depression shape configuration 298J come into contact with each other in the form of a projection and a depression when the memory card 201J is inserted from the opening part 192 into the casing 190 of the slot structure 4J.

In the fifth example, as shown in FIG. 16B and FIG. 16C, unlike the first example, the antenna 136 is not disposed at the part of the projection shape configuration 198J, but is disposed at a position shifted from the part of the projection shape configuration 198J to such a degree that the antennas 136 and 236 do not overlap each other. The dielectric transmission line 9J is provided in a wall surface of the casing 190 along a surface of the board 102 so as to make a connection from the part of the projection shape configuration 198J to a part where the antenna 136 is disposed.

For example, the dielectric transmission line 9J has a through part (or a groove part) for region demarcation which part is provided in the casing 190. The through part is provided along the surface of the casing 190, and is made so as to connect mounting regions of the antenna 136 and the antenna 236 to each other in a state of the memory card 201J being inserted in the slot structure 4J. The through part (or the groove part) is then filled with a dielectric material 143 capable of transmitting millimeter wave signals more efficiently than the dielectric material of the casing 190 (easily transmitting millimeter wave signals). Also in this case, the periphery of the dielectric transmission line 9J may be surrounded by a conductor 144 as in the first example. Alternatively, the dielectric material of the casing 190 may be used as it is, only surrounding the periphery of a part between the mounting regions of the antenna 136 and the antenna 236 by a conductor 144 in the state of the memory card 201J being inserted in the slot structure 4J. The dielectric transmission line 9J similar to a dielectric waveguide can be formed by these structures.

Incidentally, by selecting a material for the board 102 and providing a guide (for example formed by a via hole group) in the board 102 along the millimeter wave signal transmission line 9, a dielectric transmission line 9A can be formed by the dielectric material itself of the board 102. For example, when a bandwidth ratio (=signal band/operating center frequency) is about 10% to 20%, the millimeter wave signal transmission line 9 can often be realized easily by using a resonant structure or the like. By using a dielectric material having a relative dielectric constant in a certain range and a dielectric loss tangent in a certain range, and making the millimeter wave signal transmission line 9 of the dielectric material having the relative dielectric constant and the dielectric loss tangent tan $\delta$, the millimeter wave signal transmission line 9 can be formed as a lossy dielectric transmission line 9A.

For example, reflected waves tend to increase in a dielectric waveguide line whose transmission loss does not increase very much even with increases in carrier frequency. When the reflected waves are to be reduced, the structure of the dielectric waveguide line is complicated. When a millimeter wave signal is transmitted at high speed, reflected waves can cause a transmission error. On the other hand, this problem can be solved by using a dielectric material with a relatively great loss (dielectric loss tangent) (for example tan $\delta \geq 0.01$) as the millimeter wave signal transmission line 9 (dielectric transmission line 9A). A lossy dielectric material also attenuates reflection. In addition, the guide provided in the board 102 enables high-speed communication processing in only a certain local region of the dielectric transmission line 9A. Attenuation is increased in other than the local region of the dielectric material having the relative dielectric constant in the certain range and tan $\delta$ (for example equal to or more than 0.01), so that disturbance caused to other than the dielectric material can be greatly reduced.

It is desirable to use an antenna structure such as a rod antenna, for example, having directionality in the planar direction of the boards 102 and 202. When an antenna structure having directionality in the direction of thickness of the boards 102 and 202 is used, a mechanism for changing a traveling direction to the planar direction of the boards 102 and 202 is desirably adopted.

When the antennas 136 and 236 are patch antennas, for example, it is desirable to mount (embed) reflectors 194_1 and 194_2 on the transmitting side and the receiving side, respectively, of the dielectric material 143 forming the dielectric transmission line 9J provided in the wall surface of the casing 190 as provisions for the patch antennas. For example, an electromagnetic wave radiated from the antenna 136 (patch antenna) on the side of the electronic device 101J first travels in the direction of thickness of the casing 190 (dielectric material 143), and is then reflected by the reflector 194_1 on the transmitting side in a surface direction and a direction of the projection shape configuration 198J of the dielectric transmission line 9J (dielectric material 143). After the electromagnetic wave travels in the planar direction of the casing 190, and reaches the reflector 194_2 on the receiving side, the electromagnetic wave is reflected in the direction of thickness of the projection shape configuration 198, and reaches the antenna 236 (patch antenna) of the memory card 201J. When the memory card 201J side is set as the transmitting side, a millimeter wave is transmitted in a reverse path.

With such a constitution, the fixing of the memory card 201J and alignment for millimeter wave signal transmission can be performed simultaneously when the memory card 201J is mounted in the slot structure 4J. The millimeter wave transmission structure according to the fifth example also employs a constitution in which the dielectric transmission line 9J forming a dielectric waveguide is interposed between transmission line coupling sections 108 and 208 (antennas 136 and 236 in particular). Even when the antennas 136 and 236 are not disposed so as to be opposed to each other, efficiency of high-speed signal transmission can be improved by confining millimeter wave signals in the dielectric transmission line 9J.

While description has been made of a case where the antenna 236 is disposed so as not to be displaced from the depression shape configuration 298J and the antenna 136 is disposed so as to be displaced from the projection shape configuration 198J, the method of the fifth example is similarly applicable to cases of dispositions in opposite manners of displacement and cases where both the antennas are disposed so as to be displaced from the projection and depression shape configurations.

The fifth example is an effective method when a space for arranging the antennas 136 and 236 cannot be secured in the position of the projection shape configuration 198J and the depression shape configuration 298J for position fixing because of layout limitations at the time of mounting the memory card 201J in the slot structure 4J.

Millimeter Wave Transmission Structure

Sixth Example

Figure 17A:
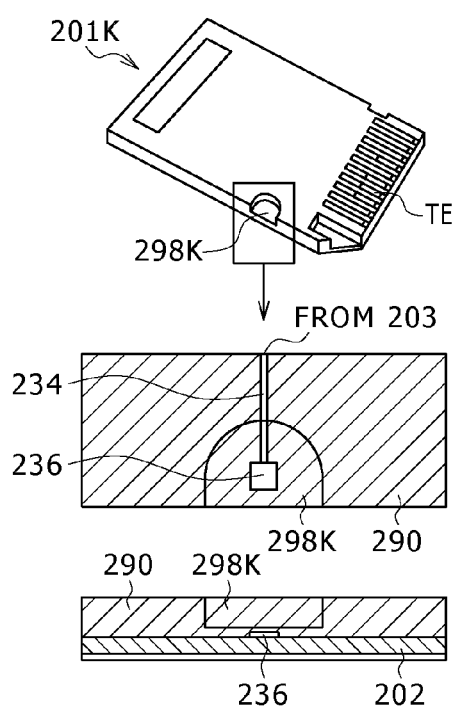
FIGS. 17A to 17C are diagrams of assistance in explaining a sixth example of the millimeter wave transmission structure according to the present embodiment.
Figure 17B:
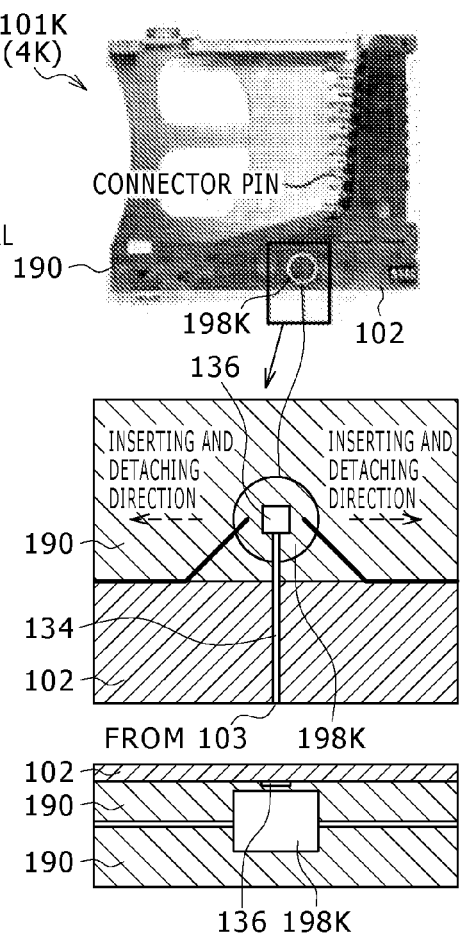
Figure 17C:
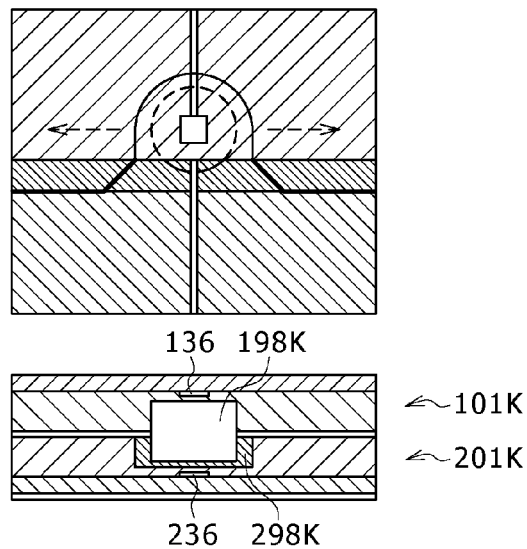

FIG. 17A to 17C are diagrams of assistance in explaining a sixth example of the millimeter wave transmission structure according to the present embodiment. In the sixth example, the millimeter wave transmission structures according to the first to fifth examples are applied to a structure for fixing an existing memory card (memory card compliant with industrial standards). That is, the constitution of the antenna coupling section and the millimeter wave signal transmission line according to the present embodiment is applied to a fixing structure applied to an existing memory card and an existing slot structure. An antenna coupling section is formed in a depression shape configuration (hollow structure) formed in an existing memory card 201, and a dielectric transmission line is formed in a slot structure corresponding to the hollow structure on the side of an electronic device 101. Description in the following will be made of an example in which the millimeter wave transmission structure according to the first example is representatively applied.

An example of structure (plane perspective and sectional perspective) of a memory card 201K is shown in FIG. 17A. The memory card 201K is the same as an existing memory card. A substantially semicircular depression shape configuration 298K for fixing to the slot structure 4K on the side of an electronic device 101K is provided in the rear surface of the memory card 201K. Applying the first example to this, an antenna 236 is disposed in a position corresponding to the depression shape configuration 298K (directly under the depression shape configuration 298K) on a board 202.

An example of structure (plane perspective and sectional perspective) of the electronic device 101K into and from which the memory card 201K is inserted and removed is shown in FIG. 17B. The slot structure 4K corresponding to the memory card 201K has a spring structure. A board 102 is attached to one surface of a casing 190 on an opposite side (outside) from an opening part 192 by a supporting member 191.

A receiving side connector is disposed at a position of contact of the slot structure 4K with the terminal of the memory card 201K. In order to maintain downward compatibility with an existing memory card 201 to which the sixth embodiment is not applied, a connector terminal is provided as in the existing memory card. By providing a connector terminal also for a signal replaced by millimeter wave transmission, signal transmission can be made by electric wiring as in a related-art case when a memory card 201 inserted into the slot structure 4K is an existing memory card to which the millimeter wave transmission structure according to the sixth example is not applied. Of course, the slot structure 4K may be a so-called legacy-free structure ready for only the memory card 201K according to the sixth example without including an interface for maintaining downward compatibility with existing memory cards.

In order to determine whether an existing memory card is inserted or whether the memory card 201K according to the sixth embodiment is inserted, it suffices to use a mechanism of making connection determination between both terminals. For example, when an existing memory card 201 has a terminal for detecting insertion (removal), it suffices to perform the sensing as usual by the terminal. When such a terminal is not provided, it suffices to use, for data or clock terminals, a method of determining whether an electric connection is established between the terminal on the side of the electronic device 101K (slot structure 4K) and the terminal on the side of the memory card 201 by a weak current. Of course, the connection determination between both terminals is not limited to such a method. There are various publicly known methods for the connection determination between both terminals, and these methods can be adopted arbitrarily. These points are similarly applicable to the first to fifth examples.

An antenna 136 is fixedly disposed in such a position as to be opposed to the antenna 236 on the board 102 when the memory card 201K is inserted in the slot structure 4K (opening part 192). In addition, a cylindrical projection shape configuration 198K fitted to the depression shape configuration 298K is formed so as to constitute a cylindrical dielectric transmission line 9K as a millimeter wave signal transmission line 9 between the antennas 136 and 236.

The projection shape configuration 198K (dielectric transmission line 9K) is configured by forming a dielectric material capable of transmitting millimeter wave signals more efficiently than the dielectric material of the casing 190 (easily transmitting millimeter wave signals) into a cylindrical shape. Unlike the first example, the conductor 144 is not disposed on the periphery of the dielectric material, but the dielectric transmission line 9K similar to a dielectric waveguide can be formed.

The dielectric transmission line 9K is movable in a direction of insertion by a spring structure, for example, when the memory card 201K is inserted into the slot structure 4K (opening part 192). When the positions of the depression shape configuration 298K and the projection shape configuration 198K (dielectric transmission line 9K) coincide with each other, the projection shape configuration 198K (dielectric transmission line 9K) is fitted into the depression shape configuration 298K.

FIG. 17C shows an example of a structure (plane perspective and sectional perspective) of a part of the projection shape configuration 198 and the depression shape configuration 298 when the memory card 201K is inserted into the slot structure 4K (opening part 192 in particular) of the electronic device 101K. As shown in the figure, the casing 190 of the slot structure 4K has a mechanical structure such that the projection shape configuration 198K (dielectric transmission line 9K) and the depression shape configuration 298K come into contact with each other in the form of a projection and a depression when the memory card 201K is inserted from the opening part 192 into the casing 190 of the slot structure 4K. When the projection and depression structures are fitted to each other, the antennas 136 and 236 are opposed to each other, and the dielectric transmission line 9K is disposed as the millimeter wave signal transmission line 9 between the antennas 136 and 236.

The memory card 201K and the slot structure 4K are fixed to each other by the above constitution. In addition, the alignment of the dielectric transmission line 9K for coupling of millimeter wave transmission is achieved so as to transmit millimeter wave signals efficiently between the antennas 136 and 236.

Thus, according to the millimeter wave transmission structure according to the sixth example, a data transmission system using millimeter waves can be achieved in use of the memory card 201K without changing the shape of the existing memory card 201K. High-speed and high-capacity data communication can be achieved by millimeter wave communication according to the present embodiment while shape compatibility with the existing memory card is maintained. Applying the millimeter wave transmission structures according to the first to fifth examples to the depression shape configuration 298K for fixing to the slot structure 4K, the depression shape configuration 298K being provided in the memory card 201K, data communication ready for high speed and high capacity in the millimeter wave band can be achieved by the millimeter wave signal transmission line 9 in conjunction with the fixing of the memory card 201K.

Millimeter Wave Transmission Structure

Seventh Example

Figure 18A:
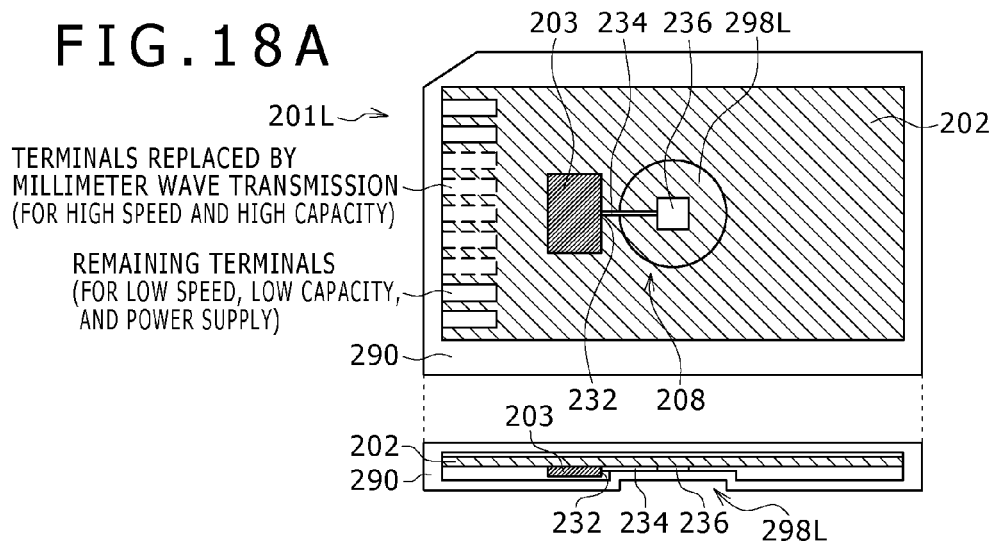
FIGS. 18A to 18C are diagrams of assistance in explaining a seventh example of the millimeter wave transmission structure according to the present embodiment.
Figure 18B:
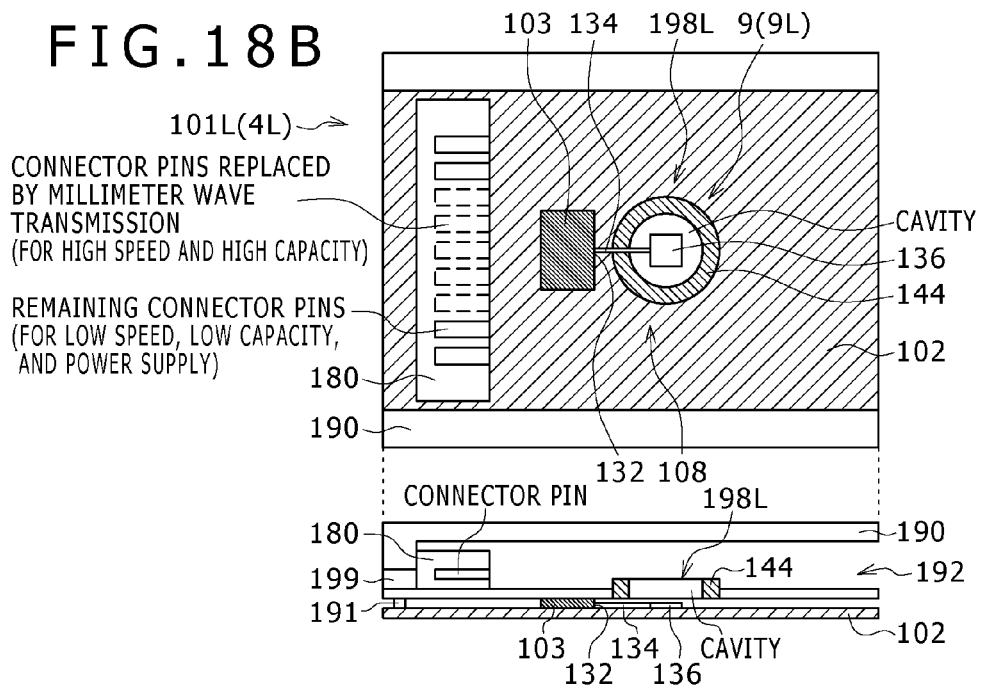
Figure 18C:
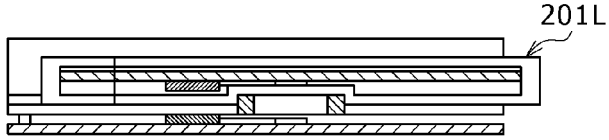

FIGS. 18A to 18C are diagrams of assistance in explaining a seventh example of the millimeter wave transmission structure according to the present embodiment. In the seventh example, the dielectric transmission line 9A is modified into a hollow waveguide 9L whose periphery is surrounded by a shielding material and whose inside is hollow. Description in the following will be made of an example of modification made to the first example as a representative example.

An example of structure (plane perspective and sectional perspective) of a memory card 201L is shown in FIG. 18A, which is exactly the same as in the first example.

An example of structure (plane perspective and sectional perspective) of an electronic device 101L is shown in FIG. 18B. Unlike the first example, the millimeter wave signal transmission line 9 is changed from the dielectric transmission line 9A to the hollow waveguide 9L.

A projection shape configuration 198L (hollow waveguide 9L) is configured by forming the inside of a tubular conductor 144 into the state of a cavity (hollow). The projection shape configuration 198L is fixedly disposed such that the center of the cavity of the conductor 144 coincides with an antenna 136 of a transmission line coupling section 108.

The diameter of the conductor 144 is made to correspond to the diameter of the depression shape configuration 298L of the memory card 201L. The enclosure of the conductor 144 is attached in a form of surrounding antennas 136 and 236. Even when the projection and depression shapes are not fitted to each other steadily, it suffices for the projection and depression shapes to be set at a size such that the antennas 136 and 236 do not fall outside the shielding material (conductor 144). It is not essential that the planar shape of the projection and depression shape configurations be a circular shape as in the figure, but the planar shape of the projection and depression shape configurations is an arbitrary shape such as a triangle, a square, or the like.

Because the enclosure confines millimeter waves in the hollow waveguide 9L, the hollow waveguide 9L of such a structure provides advantages of being able to transmit millimeter waves with a little millimeter wave transmission loss, suppressing external radiation of millimeter waves, and more facilitating EMC measures, for example.

Incidentally, it suffices for the hollow waveguide 9L to be a hollow structure whose periphery is surrounded by a shielding material and whose inside is hollow, and the hollow waveguide 9L is not limited to the structure having the enclosure formed by the conductor 144 on a board as shown in the above. For example, the wall surface of a hole (that may be a through hole or a non-through hole) made in a relatively thick board may be used as the enclosure. In this case, the side wall of the hole may be covered with a conductor, or does not need to be covered with a conductor. In the latter case, millimeter waves are reflected and intensely distributed in the hole due to a ratio in relative dielectric constant between the board and the air. When the hole is made to pass through, the antennas 136 and 236 are desirably disposed (attached) on the back surfaces of semiconductor chips 103 and 203 housing signal generating parts 107 and 207. When the hole is stopped halfway without being made to pass through, it suffices to place the antennas 136 and 236 on the bottom of the hole.

While the present invention has been described above using embodiments thereof, the technical scope of the present invention is not limited to that described in the foregoing embodiments. Various changes and improvements can be made to the foregoing embodiments without departing from the spirit of the invention, and forms obtained by adding such changes and improvements are also included in the technical scope of the present invention.

In addition, the foregoing embodiments do not limit inventions of claims, and not all combinations of features described in the embodiments are necessarily essential to solving means of the invention. The foregoing embodiments include inventions in various stages, and various inventions can be extracted by appropriately combining a plurality of disclosed constitutional requirements. Even when a few constitutional requirements are omitted from all the constitutional requirements disclosed in the embodiments, constitutions resulting from the omission of the few constitutional requirements can be extracted as inventions as long as an effect is obtained.

For example, in each example of the millimeter wave transmission structure described above, a card type information processing device (card type device) is set as an example of a first electronic device, and a slot structure is provided as an example of a mounting structure to a second electronic device as a main unit side. However, the present invention is not limited to these examples. For example, the mounting structure mounted with the card type device is not limited to the slot structure. In addition, for example, while a card type information processing device (card type device) is described as an example of a first electronic device in each example of the millimeter wave transmission structure described above, the first electronic device mounted into the mounting structure of the second electronic device as the main unit side is not limited to a card type device. Examples of modification of these devices will be described in the following.

Millimeter Wave Transmission Structure

Eighth Example

Figure 19A:
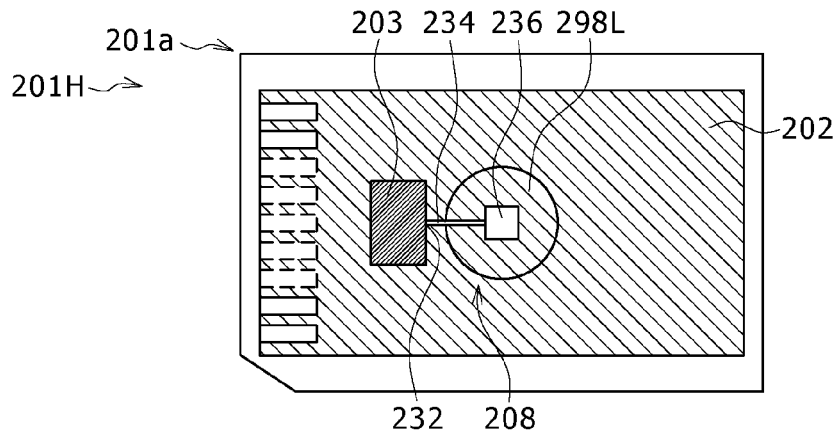
FIGS. 19A to 19C are diagrams of assistance in explaining an eighth example of the millimeter wave transmission structure according to the present embodiment.
Figure 19B:
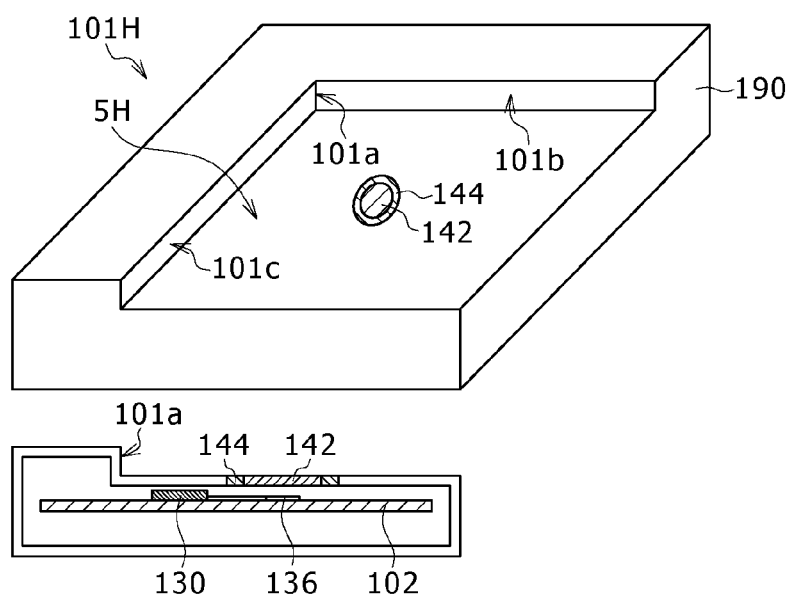
Figure 19C:
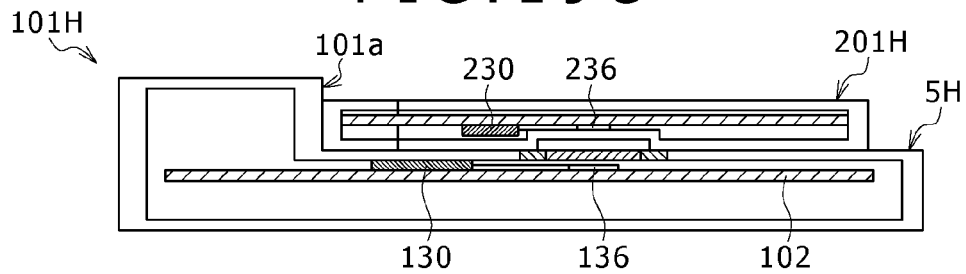

FIGS. 19A to 19C are diagrams of assistance in explaining an eighth example of the millimeter wave transmission structure according to the present embodiment, and are of assistance in explaining an example of modification of the mounting structure in particular. A part of a casing 190 of an electronic device 101H is formed so as to function as a plane-shaped base for mounting a card (which base will be referred to as a mounting base 5H). The mounting base 5H is an example of a mounting structure mounted with a memory card 201H. A state in which the memory card 201H is mounted at a defined position of the mounting structure is the same as the "mounted" state in each of the examples described above. That is, also in such a mode, the first electronic device (memory card 201H in this example) is mounted in the mounting structure of the second electronic device (electronic device 101H in this example).

As in the first example of the millimeter wave transmission structure (FIGS. 12A to 12C), for example, a semiconductor chip 103 is housed and an antenna 136 is provided at a certain position within the casing 190 as a lower part of the mounting base 5H. A dielectric waveguide 142 that is formed as a dielectric transmission line 9A whose internal transmission line is formed by a dielectric material and which waveguide has an external part surrounded by a conductor 144 is provided in a part of the casing 190 which part is opposed to the antenna 136. Incidentally, it is not essential to provide the dielectric waveguide 142 (dielectric transmission line 9A), but the millimeter wave signal transmission line 9 may be formed by the dielectric material of the casing 190 as it is. These points are similar to those of the foregoing other examples of structure.

A wall surface defining a position where the memory card 201 is placed is formed on the casing 190 so as to define the mounting position of the memory card 201H. Two side edges 101b and 101c forming an angle 101a rise to form a wall surface in the mounting position in the casing 190 so as to define one angle 201a of the memory card 201H, for example. It is a principle that the memory card 201H is butted against the wall surface (side edges 101b and 101c) (which will be referred to as a wall surface butting system) when the memory card 201H is placed on the mounting base 5H.

Such a constitution makes it possible to perform alignment for millimeter wave signal transmission of the memory card 201H at the time of placing (mounting) the memory card 201H in the mounting base 5H. Although a casing 290 (and 190) is interposed between the antennas 136 and 236, the casing 290 is a dielectric material, and thus does not greatly affect millimeter wave transmission.

The millimeter wave transmission structure according to the eighth example thus employs a constitution in which the dielectric transmission line 9A is interposed between transmission line coupling sections 108 and 208 (antennas 136 and 236 in particular) when the memory card 201H is mounted in the defined position of the mounting base 5H. The efficiency of high-speed signal transmission can be improved by confining millimeter wave signals in the dielectric transmission line 9A.

Though the concept of a fitting structure is not adopted, the wall surface butting system opposes the antenna 136 and the antenna 236 to each other when the memory card 201H is placed so as to be butted against the angle 101a of the mounting base 5H. Thus effects of positional displacement can be surely eliminated.

Though not shown, a plurality of antennas 136 may be juxtaposed to each other in a planar form under the mounting base 5H, and a millimeter wave signal for a check may be sent out from the antenna 236 of the memory card 201H prior to actual signal transmission to select an antenna 136 having a highest reception sensitivity. This makes a system configuration somewhat complicated, but makes it unnecessary to care about the mounting position where the memory card 201H is mounted on the mounting base 5H.

Millimeter Wave Transmission Structure

Ninth Example

Figure 20A:
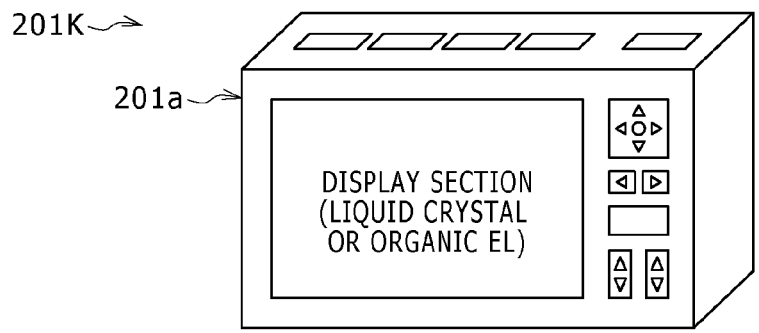
FIGS. 20A to 20C are diagrams of assistance in explaining a ninth example of the millimeter wave transmission structure according to the present embodiment.
Figure 20B:
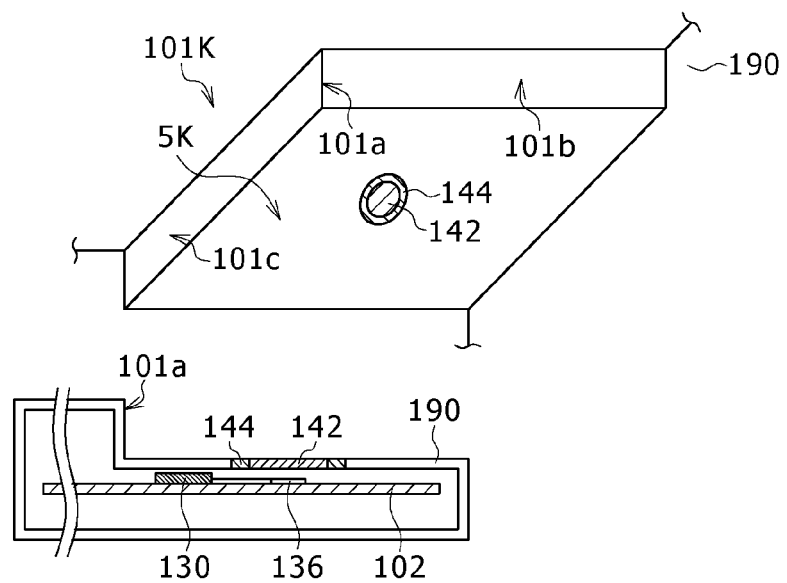
Figure 20C:
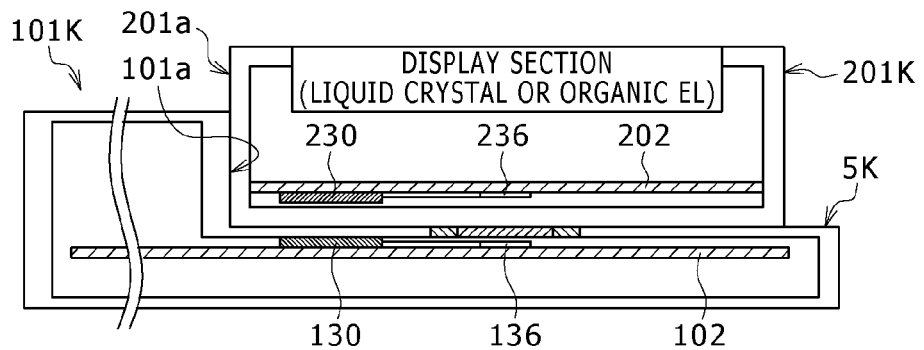

FIGS. 20A to 20C are diagrams of assistance in explaining a ninth example of the millimeter wave transmission structure according to the present embodiment, and are of assistance in explaining an example of modification of the electronic device in particular. A radio transmission system 1K includes a portable type image reproducing device 201K as an example of a first electronic device, and includes an image obtaining device 101K as an example of a second electronic device in which to mount the image reproducing device 201K. As in the eighth example, the image obtaining device 101K has a mounting base 5K to be mounted with the image reproducing device 201K as a part of a casing 190. Incidentally, a slot structure 4 as in the first to seventh examples may be used in place of the mounting base 5K.

The image obtaining device 101K has substantially the shape of a rectangular parallelepiped (box shape), and can no longer be said to be a card type. It suffices for the image obtaining device 101K to obtain moving image data, for example. A digital recording and reproducing device or a terrestrial television receiver, for example, corresponds to the image obtaining device 101K. The image reproducing device 201K includes, as an memory functional section 205, a storage device for storing moving image data transmitted from the side of the image obtaining device 101K and a functional part for reading moving image data from the storage device and reproducing a moving image on a display section (for example a liquid crystal display device or an organic EL display device). It suffices to consider from a structural viewpoint that the memory card 201 is replaced with the image reproducing device 201K and that the electronic device 101 is replaced with the image obtaining device 101K.

As in the first example of the millimeter wave transmission structure (FIGS. 12A to 12C), for example, a semiconductor chip 103 is housed and an antenna 136 is provided at a certain position within the casing 190 as a lower part of the mounting base 5K. A dielectric waveguide 142 that is formed as a dielectric transmission line 9A whose internal transmission line is formed by a dielectric material and which waveguide has an external part surrounded by a conductor 144 is provided in a part of the casing 190 which part is opposed to the antenna 136. Incidentally, it is not essential to provide the dielectric waveguide 142 (dielectric transmission line 9A), but the millimeter wave signal transmission line 9 may be formed by the dielectric material of the casing 190 as it is. These points are similar to those of the foregoing other examples of structure. Incidentally, as described in the eighth example, a plurality of antennas 136 may be juxtaposed to each other in a planar form, and a millimeter wave signal for a check may be sent out from the antenna 236 of the image reproducing device 201K prior to actual signal transmission to select an antenna 136 having a highest reception sensitivity.

As in the first example of the millimeter wave transmission structure (FIGS. 12A to 12C), for example, a semiconductor chip 203 is housed and an antenna 236 is provided at a certain position within the casing 290 of the image reproducing device 201K mounted on the mounting base 5K. A millimeter wave signal transmission line 9 (dielectric transmission line 9A) is formed by a dielectric material in a part of the casing 290 which part is opposed to the antenna 236. These points are similar to those of the foregoing other examples of structure.

Such a constitution makes it possible to perform alignment for millimeter wave signal transmission of the image reproducing device 201K at the time of placing (mounting) the image reproducing device 201K in the mounting base 5K. Although the casings 190 and 290 are interposed between the antennas 136 and 236, the casings 190 and 290 are a dielectric material, and thus do not greatly affect millimeter wave transmission.

The millimeter wave transmission structure according to the ninth example thus employs a constitution in which the dielectric transmission line 9A is interposed between transmission line coupling sections 108 and 208 (antennas 136 and 236 in particular) when the image reproducing device 201K is mounted in the defined position of the mounting base 5K. The efficiency of high-speed signal transmission can be improved by confining millimeter wave signals in the dielectric transmission line 9A.

Though the concept of a fitting structure is not adopted, a wall surface butting system similar to that of the eighth example opposes the antenna 136 and the antenna 236 to each other when the image reproducing device 201K is placed so as to be butted against the angle 101a of the mounting base 5K. Thus effects of positional displacement can be surely eliminated.

The present application contains subject matter related to that disclosed in Japanese Priority Patent Application JP 2009-164507 filed in the Japan Patent Office on Jul. 13, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A radio transmission system comprising:
a first electronic device having a first antenna;
a second electronic device having a second antenna and a mounting structure on which said first electronic device is mounted,
wherein,
a millimeter wave signal transmission line capable of transmitting information in a millimeter wave band is formed between said first electronic device and said second electronic device when said first electronic device is mounted in said mounting structure of said second electronic device,
in one of said first electronic device and said second electronic device, a transmission object signal is converted into a millimeter wave signal and then the millimeter wave signal is transmitted via said millimeter wave signal transmission line to the other of said first electronic device and said second electronic device, and
said first antenna and said second antenna are opposed to each other and are disposed such that a center of each antenna coincides with a center of said millimeter wave signal transmission line.

2. The radio transmission system according to claim 1, wherein said millimeter wave signal transmission line has a structure that transmits the millimeter wave signal while confining the millimeter wave signal in the transmission line.

3. The radio transmission system according to claim 2, wherein said millimeter wave signal transmission line is a dielectric transmission line formed by a dielectric material having a characteristic of being capable of transmitting the millimeter wave signal.

4. The radio transmission system according to claim 3, wherein a shielding material for suppressing external radiation of the millimeter wave signal is disposed on a periphery of said dielectric material.

5. The radio transmission system according to claim 2, wherein said millimeter wave signal transmission line is a hollow waveguide forming a transmission line, a shielding material for suppressing external radiation of the millimeter wave signal being disposed so as to surround said transmission line, and said transmission line inside said shielding material being hollow.

6. The radio transmission system according to claim 1, wherein:
said mounting structure has a position defining section configured to define a mounted state of said first electronic device by a fitting structure,
said first electronic device has a position defining section corresponding to said position defining section on a side of said mounting structure, and
said millimeter wave signal transmission line is formed in said position defining section of one of said mounting structure and said first electronic device.

7. The radio transmission system according to claim 6, wherein:
shape of a casing of said first electronic device is in accordance with industrial standards, and
position defining sections formed in accordance with said industrial standards are used as said position defining section of said first electronic device and said position defining section of said mounting structure.

8. The radio transmission system according to claim 7, wherein when said first electronic device in accordance with said industrial standards is mounted in said mounting structure, a transmission object signal is transmitted by electric connection between said first electronic device and said second electronic device.

9. The radio transmission system according to claim 6, wherein:
said first antenna is configured for coupling the millimeter wave signal to said millimeter wave signal transmission line in said position defining section of said first electronic device as a transmission line coupling section configured to couple the millimeter wave signal to said millimeter wave signal transmission line, and
said second antenna is configured for coupling the millimeter wave signal to said millimeter wave signal transmission line in said position defining section of said mounting structure as a transmission line coupling section configured to couple the millimeter wave signal to said millimeter wave signal transmission line.

10. The radio transmission system according to claim 1, wherein:
each of said first electronic device and said second electronic device has a changing section configured to change transmission and reception timing on a time division basis, and
half-duplex bidirectional transmission is performed using said millimeter wave signal transmission line of one system.

11. The radio transmission system according to claim 1, wherein:
said first electronic device and said second electronic device make frequency of a millimeter wave signal for transmission and frequency of a millimeter wave signal for reception different from each other, and full-duplex bidirectional transmission is performed using said millimeter wave signal transmission line of one system.

12. The radio transmission system according to claim 1, wherein:
   said first electronic device and said second electronic device make frequency of a millimeter wave signal for transmission and frequency of a millimeter wave signal for reception a same frequency, and
   full-duplex bidirectional transmission is performed using respective separate said millimeter wave signal transmission lines for transmission and reception.

13. The radio transmission system according to claim 1, wherein said first electronic device and said second electronic device have a multiplexing processing section configured to integrate a plurality of transmission object signals into one system by time division processing to perform transmission and a simplification processing section.

14. The radio transmission system according to claim 1, wherein said first electronic device and said second electronic device have a multiplexing processing section configured to make frequency of the millimeter wave signal different for a plurality of transmission object signals respectively to perform transmission and a simplification processing section.

15. The radio transmission system according to claim 1, wherein:
   said first electronic device and said second electronic device make frequency of the millimeter wave signal a same frequency for a plurality of transmission object signals, and
   transmission is performed using respective separate said millimeter wave signal transmission lines for said plurality of transmission object signals.

\* \* \* \* \*